United States Patent
Adachi

(10) Patent No.: US 9,771,305 B2
(45) Date of Patent: Sep. 26, 2017

(54) SINTERING APPARATUS, METHOD OF MANUFACTURING SINTERED COMPACT, AND TARGET MATERIAL

(71) Applicant: Sony Corporation, Tokyo (JP)

(72) Inventor: Kiwamu Adachi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 156 days.

(21) Appl. No.: 14/294,734

(22) Filed: Jun. 3, 2014

(65) Prior Publication Data
US 2014/0367251 A1 Dec. 18, 2014

(30) Foreign Application Priority Data

Jun. 18, 2013 (JP) .................................. 2013-127684

(51) Int. Cl.
| | | |
|---|---|---|
| B29C 43/10 | (2006.01) | |
| C04B 35/645 | (2006.01) | |
| B28B 3/02 | (2006.01) | |
| B28B 7/44 | (2006.01) | |
| B30B 11/02 | (2006.01) | |
| B30B 15/34 | (2006.01) | |
| B30B 15/00 | (2006.01) | |

(52) U.S. Cl.
CPC ............ *C04B 35/645* (2013.01); *B28B 3/025* (2013.01); *B28B 7/44* (2013.01); *B30B 11/027* (2013.01); *B30B 15/0017* (2013.01); *B30B 15/34* (2013.01)

(58) Field of Classification Search
CPC ... B30B 15/0017; B30B 15/34; B30B 15/027; B28B 3/025; B28B 7/44
USPC ......... 425/78, 345, 352–353, 359, 423, 453, 425/405.1, 405.2
See application file for complete search history.

(56) References Cited

U.S. PATENT DOCUMENTS 3,794,458 A * 2/1974 Iwasaki ............... B30B 15/0017
425/353
4,720,256 A * 1/1988 Asari .................... B30B 11/002
425/405.2
5,851,568 A * 12/1998 Huang .................. B30B 11/007
425/330

FOREIGN PATENT DOCUMENTS

| JP | 06-297198 | 10/1994 |
| JP | 09-318273 | 12/1997 |

* cited by examiner

*Primary Examiner* — Joseph S Del Sole
*Assistant Examiner* — Thukhanh T Nguyen
(74) *Attorney, Agent, or Firm* — Dentons US LLP

(57) ABSTRACT

A sintering apparatus includes: a non-transportable section mounted in the atmosphere; a transportable section that has a mold capable of accommodating a material to be processed and is loaded detachably with respect to the non-transportable section; and a covering member that envelops the transportable section loaded on the non-transportable section in an almost hermetically sealed state and allows the transportable section to be separated from the non-transportable section with the transportable section enveloped in the almost hermetically sealed state.

15 Claims, 37 Drawing Sheets

|  | CONTINUOUS GAS INTRODUCTION | STEPWISE GAS INTRODUCTION | | |
|---|---|---|---|---|
|  |  | FIRST CASE | SECOND CASE | THIRD CASE |
| SETTING OF COVERING MEMBER 4 | — | — | — | — |
| INITIAL PRESSURIZATION | — | — | — | — |
| GAS DISPLACEMENT | GAS ON | GAS ON | GAS OFF (NO GAS DISPLACEMENT IS PERFORMED) | GAS ON |
| SINTERING | GAS ON | GAS OFF | GAS OFF | GAS OFF |
| COOLING | GAS ON | GAS ON | GAS ON | GAS OFF |

FIG. 25

SINTERING APPARATUS, METHOD OF MANUFACTURING SINTERED COMPACT, AND TARGET MATERIAL

CROSS REFERENCE TO RELATED APPLICATIONS

This application claims the benefit of Japanese Priority Patent Application JP 2013-127684 filed on Jun. 18, 2013, the entire contents of which are incorporated herein by reference.

BACKGROUND

The present disclosure relates to a sintering apparatus that is preferred for preparing a target material and the like for the sputtering film formation, a method of manufacturing a sintered compact using such a sintering apparatus, and a target material.

In a thin-film formation process using a sputtering method, a composition and a density of a target material significantly determine the properties of such a process and the characteristics of a device to be manufactured by the film formation. Therefore, a target material having the high density and high compositional homogeneity has been desired.

At present, in the manufacturing of a target material for sputtering, the use of a vacuum hot pressing apparatus (for example, see Japanese Unexamined Patent Application Publication No. H6-297198 and No. H9-318273) has become mainstream. In the vacuum hot pressing apparatus, the controllability and uniformity of the density, crystallinity, composition, and the like are significantly improved by carrying out pressure sintering under vacuum or under controlled atmosphere.

On the other hand, in a case of this method, a heating and sintering section is configured of a robust housing capable of being immune to high vacuum, leading to a complicate and expensive apparatus configuration. Further, an increase in volume of a container and thermal capacity causes much time to be taken for vacuuming, atmosphere replacement, heating, and cooling, resulting in a longer takt time and degradation in productivity.

On the contrary, a hot pressing apparatus having no housing or only a simple enclosure that carries out sintering under an air atmosphere is not comparable to a vacuum hot pressing apparatus in terms of the atmosphere control, but is advantageous in a simplified structure and a decrease in overall thermal capacity. It is possible to remove a material to be sintered together with a mold (dice) from the hot pressing apparatus at the stage when sintering is completed, which ensures a reduced takt time and improved productivity.

SUMMARY

However, when sintering is carried out under an air atmosphere, an issue has occurred that a mold made of a carbon graphite material may react to oxygen in the air at high temperature, and thus an outer diameter of the mold may become smaller, what is called, may consume every time the sintering is performed.

It is desirable to provide a sintering apparatus capable of maintaining high productivity and suppressing consumption of a mold, a method of manufacturing a sintered compact using such a sintering apparatus, and a target material.

According to an embodiment of the present disclosure, there is provided a sintering apparatus including following (A) to (C):

(A) a non-transportable section mounted in the atmosphere;
(B) a transportable section that has a mold capable of accommodating a material to be processed and is loaded detachably with respect to the non-transportable section; and
(C) a covering member that envelops the transportable section loaded on the non-transportable section in an almost hermetically sealed state and allows the transportable section to be separated from the non-transportable section with the transportable section enveloped in the almost hermetically sealed state.

Here, the "non-transportable section" refers to any of members (pressure ram, high-frequency induction coil, pedestal, and the like) that is fixed to a floor, wall, ceiling, and the like in a building to be allowed to move or make a positional adjustment as appropriate, but is difficult for dismounting from a building and for transportation. The "almost hermetically sealed state" refers to a state of both configuring a closed space at an inner side of the covering member and permitting outflow/inflow of the minimum amount of gas that may be caused in association with expansion and contraction of inner gas in the closed space.

In the sintering apparatus according to the above-described embodiment of the present disclosure, the transportable section is enveloped by the covering member in the almost hermetically sealed state, which suppresses reaction of a mold with oxygen in the air at high temperature at the sintering time and consumption of the mold. Upon completion of the sintering, the transportable section is separated from the non-transportable section with the transportable section enveloped by the covering member in the almost hermetically sealed state to be moved to another location for cooling. This allows the subsequent sintering to be started immediately, leading to the improved productivity.

According to an embodiment of the present disclosure, there is provided a method of manufacturing a sintered compact, the method including the following (A) to (D):

(A) loading a transportable section having a mold accommodating a material to be processed on a non-transportable section that is mounted in the atmosphere;
(B) enveloping the transportable section in an almost hermetically sealed state by means of a covering member;
(C) pressurizing and heating the material to be processed in the mold with the transportable section enveloped by the covering member in the almost hermetically sealed state; and
(D) separating the transportable section from the non-transportable section with the transportable section enveloped by the covering member in the almost hermetically sealed state after pressurizing and heating the material to be processed in the mold.

According to an embodiment of the present disclosure, there is provided a target material, the target material being manufactured by loading a transportable section having a mold accommodating a material to be processed including a target raw material on a non-transportable section that is mounted in the atmosphere, and thereafter by pressurizing and heating the material to be processed in the mold with the transportable section enveloped by the covering member in the almost hermetically sealed state.

According to the sintering apparatus of the above-described embodiment of the present disclosure, there is provided the covering member that envelops the transportable section loaded on the non-transportable section in the almost hermetically sealed state and allows the transportable section to be separated from the non-transportable section with the transportable section enveloped in the almost hermetically sealed state. Further, according to the method of manufacturing a sintered compact of the above-described embodiment of the present disclosure, a material to be processed in the mold is pressurized and heated with the transportable section enveloped by the covering member in the almost hermetically sealed state, and thereafter the transportable section is separated from the non-transportable section with the transportable section enveloped in the almost hermetically sealed state. This makes it possible to maintain high productivity and to suppress consumption of a mold.

According to the target material of the above-described embodiment of the present disclosure, the target material is manufactured by pressurizing and heating a material to be processed in the mold with the transportable section enveloped by the covering member in the almost hermetically sealed state, which ensures high productivity and suppression of mold consumption, resulting in cost reduction being achieved.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and constitute a part of this specification. The drawings illustrate embodiments and, together with the specification, serve to explain the principles of the present technology.

FIG. 25 is a table summarizing gas introduction/stoppage in four manufacturing methods illustrated in FIG. 24.

DETAILED DESCRIPTION

Figure 1:
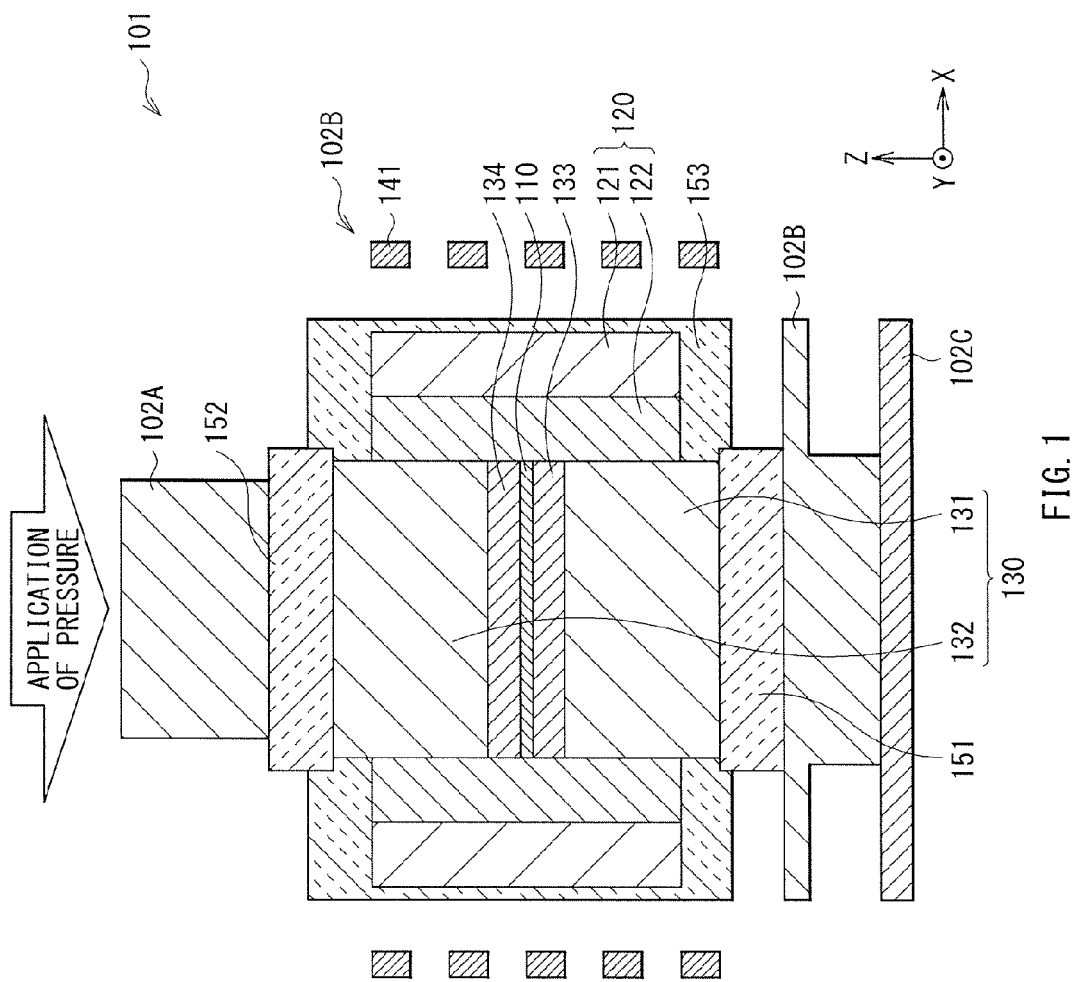
FIG. 1 is a cross-sectional view showing a configuration of a sintering apparatus according to a reference example 1 of the present disclosure.

Hereinafter, some embodiments of the present disclosure are described in details with reference to the drawings. It is to be noted that the descriptions are provided in the order given below.
1. Experimental Result of Reference Example 1
2. First Embodiment (an example where a covering member is supported in a suspending arrangement by the surface contact with a top surface of a main body, and a gap is provided between the covering member and a support base)
3. Second Embodiment (an example where a step is provided on a top surface of a main body for positioning a covering member in the first embodiment)
4. Third Embodiment (an example where a covering member is provided with a step following a corner on a top surface of a main body in the first embodiment)
5. Fourth Embodiment (an example where a covering member is configured in a two-piece arrangement, and a tubular lower covering member is covered with a tectiform upper covering member)
6. Fifth Embodiment (an example where a covering member is configured in a two-piece arrangement, and a disk-shaped upper covering member is loosely fitted to a tubular lower covering member)
7. Sixth Embodiment (an example where a covering member is supported by the surface contact with a support base, and a gap is provided between the covering member and a side surface of a main body)
8. Seventh Embodiment (an example where a gas introduction pipe is connected to a covering member in the first embodiment)
9. Eighth Embodiment (an example where a gas diffusion chamber and a gas blowoff outlet are provided in the seventh embodiment)
10. Ninth Embodiment (an example where a gas introduction pipe is connected to an upper covering member, and a gas diffusion chamber and a gas blowoff outlet are provided in the fifth embodiment)
11. Tenth Embodiment (an example where a gas introduction pipe is connected to a covering member, and a gas diffusion chamber and a gas blowoff outlet are provided in the sixth embodiment)
12. Eleventh Embodiment (an example where a gas introduction pipe is connected to underside of a lower covering member, and a gas diffusion chamber and a gas blowoff outlet are provided in the fifth embodiment)
13. Modification Example 1 (an example where a covering member is made of a ceramic material, and an opening for temperature measurement is provided on the side surface in the first embodiment)
14. Modification Example 2 (an example where each of an upper covering member and a lower covering member is made of a ceramic material, and an opening for temperature measurement is provided on the side surface of the lower covering member in the fifth embodiment)
15. Modification Example 3 (an example where an upper covering member is made of a ceramic material, and a lower covering member is made of quartz glass in the fifth embodiment)
16. Modification Example 4 (an example where a hole heading toward the internal direction from the outer surface of a mold is provided in the first embodiment)
17. Modification Example 5 (an example where a hole is provided at a position different from a placement position of a material to be processed in a height direction of a mold in the modification example 4)

At the beginning, prior to the description on individual specific embodiments, as presupposition matters that form the basis of the present disclosure in common to these embodiments, the consumption of a mold at the time of sintering under the air atmosphere is described on the basis of an experimental result.

(Apparatus Configuration in Reference Example 1)

A sintering apparatus 101 as shown in FIG. 1 was used. This sintering apparatus 101 was configured to include a mold 120 to accommodate a material to be processed 110 that is a material to be sintered, a punch 130 and a pressure ram 102A that apply uniaxial pressure to the material to be processed 110 in a vertical direction, and a heating section 102B having a high-frequency induction coil 141. The mold 120 was mounted on a support base 103B and a pedestal 102C. The mold 120 was configured to define a planar shape of the material to be processed 110 by fitting an insert dice (inner mold) into a dice (outer mold) 121. The punch 130 was configured to interpose the material to be processed 110 between a lower punch 131 and an upper punch 132 from top and bottom.

Here, in FIG. 1, a pressure direction (vertical direction) from the lower punch 131 and the upper punch 132 is defined as Z direction, and a plane orthogonal to the Z direction is defined as XY plane.

A lower spacer 133 for adjusting a thickness was provided between the lower punch 131 and the material to be processed 110. An upper spacer 134 for adjusting a thickness was provided between the upper punch 132 and the material to be processed 110.

Each of the dice 121, the insert dice 122, the lower punch 131, the upper punch 132, the lower spacer 133, and the upper spacer 134 was configured of a carbon material (more specifically, carbon graphite).

Further, the punch 130 was interposed between a lower heat-insulating plate 151 and an upper heat-insulating plate 152 each of which is made of a ceramic material from top and bottom. A heat-insulating material 153 made of a ceramic fiber and the like was wound on the surfaces (side surfaces, top surfaces, and bottom surfaces) of the mold 120 and the punch 130.

(Experiment and Result)

The sintering process was repeated at temperature of about 1200 degrees centigrade using this sintering apparatus 101, and a relationship between a diameter and the number of uses of the mold 120 at that time was examined. The result is shown in FIG. 2.

Figure 2:
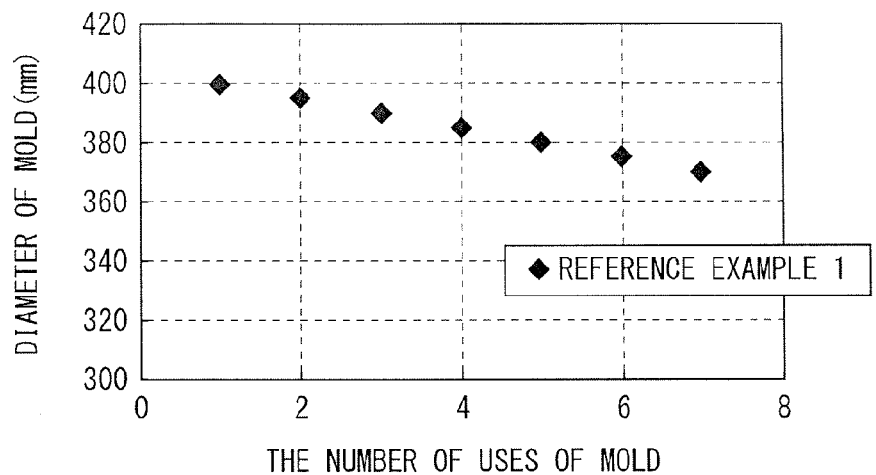
FIG. 2 is a graphic diagram showing an experimental result that examined a relationship between a diameter and the number of uses of a mold in the reference example 1 that is illustrated in FIG. 1.

As seen from FIG. 2, in the reference example 1, the mold 120 consumes by about 5 mm every time the sintering is performed, and will outlive usefulness thereof once it reaches a minimum thickness sustainable to pressure. In particular, in a case of the high-temperature sintering of a ceramic material and the like, a degree of consumption increases significantly, which may complicate management of a degree of consumption and a stock of the mold 120, and the like. Further, consumption costs of the expensive mold 120 may cause the manufacturing costs of a sintered compact, and therefore those of a finished product to be raised.

Figure 3:
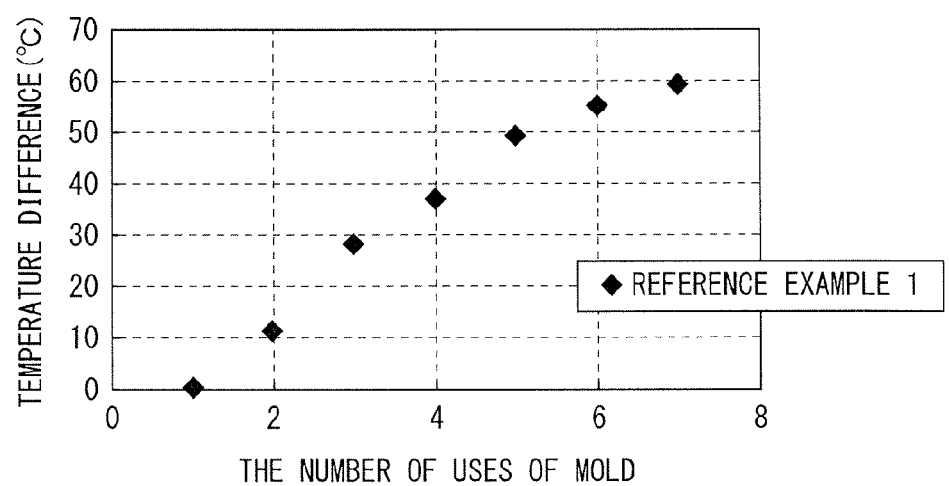
FIG. 3 is a graphic diagram showing an experimental result that examined a relationship between a temperature difference in a central part after passage of a given length of time and the number of uses of the mold in the reference example 1 that is illustrated in FIG. 1.

Further, such a matter does not simply relate to only a lifetime of the mold 120. For example, when the mold 120 is heated using a high-frequency induction heating method, to begin with, an outer surface of the mold 120 is heated, and thereafter the heating makes progress toward the inner side of the mold 120. As the mold 120 consumes and a thickness thereof becomes smaller, a distance between a heat-generating point of the mold 120 (outer surface of the mold 120) and the material to be processed 110 varies every time the mold 120 is used, and temperature at a central part of the mold 120 rises sooner. Therefore, as shown in FIG. 3, this causes a change in the time taken to reach the target temperature and temperature gradient. That is, the temperature history is different for each of the number of sintering, and variations in the quality occur for the property of a finished sintered compact. It is to be noted that, for the temperature in the vicinity of a central part of the mold 20 after passage of a given length of time, FIG. 3 plots a difference between any of the temperature from a second time on and the temperature at a first time out of the number of uses of the mold 20 when the temperature at the first time is used as a reference.

(Analysis of Result)

As described above, it was found that, in the sintering apparatus 101 of an atmospheric sintering type, the consumption of the mold 120 had a serious influence on an increase in manufacturing costs, variations in the quality of the sintered compact, and the like. On the other hand, in the sintering apparatus 101 of the atmospheric sintering type, it is possible to detach a material to be sintered together with the mold 120 at a stage when the sintering is completed. Therefore, the sintering apparatus 101 has an advantage that a takt time is reduced, and the productivity is improved. It may be preferable that the consumption of the mold 120 be suppressed without compromising such an advantage.

More specifically, if a transportable section including the mold 120 that is mounted on a non-transportable section (pressure ram 102A, heating section 102B, and the like) is enveloped by a covering member in the almost hermetically sealed state, it is possible to suppress reaction of the mold 120 with oxygen in the air at high temperature at the sintering time and consumption of the mold. Upon completion of the sintering, if it is possible to separate the transportable section from the non-transportable section with the transportable section enveloped by the covering member in the almost hermetically sealed state, the improved productivity of the atmospheric sintering type is maintained.

Hereinafter, specific embodiments (first to eleventh embodiments) are described on the basis of this experimental result and analysis thereof.

First Embodiment (Sintering Apparatus)

Figure 4:
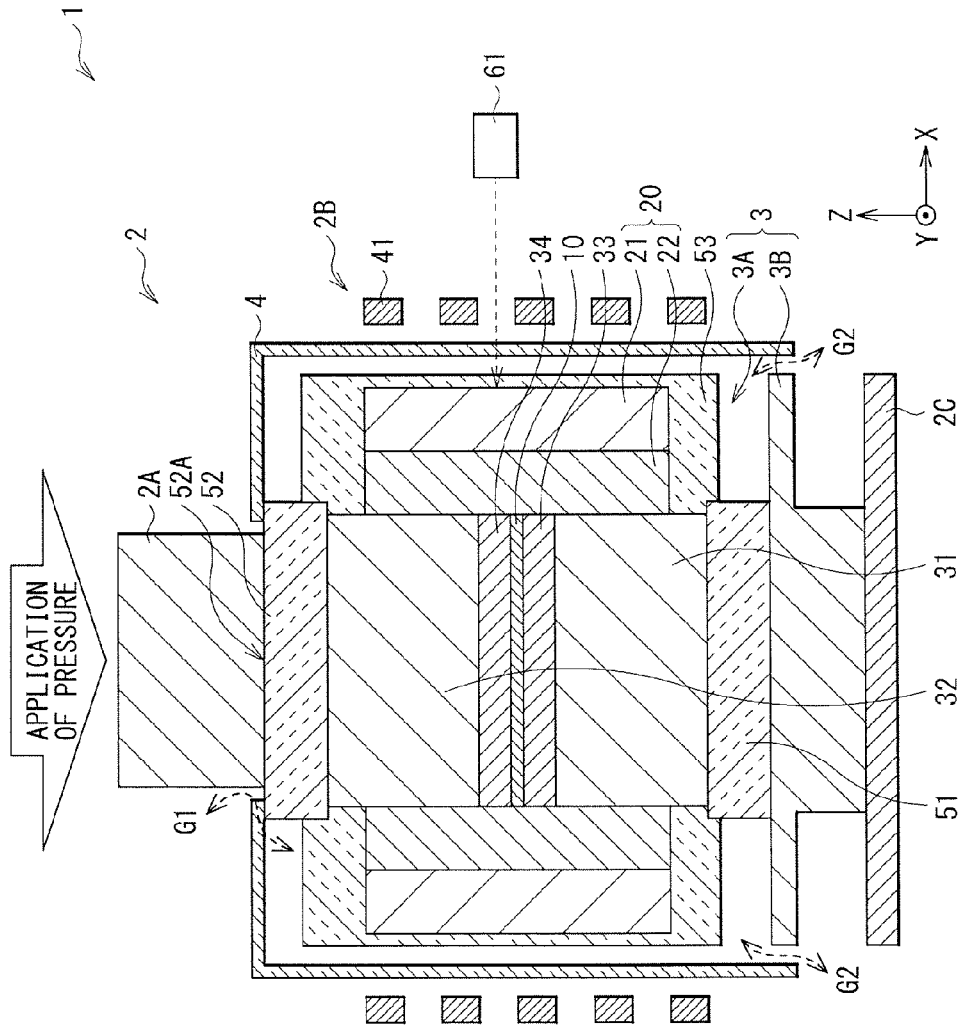
FIG. 4 is a cross-sectional view showing a configuration of a sintering apparatus according to a first embodiment of the present disclosure.
Figure 5:
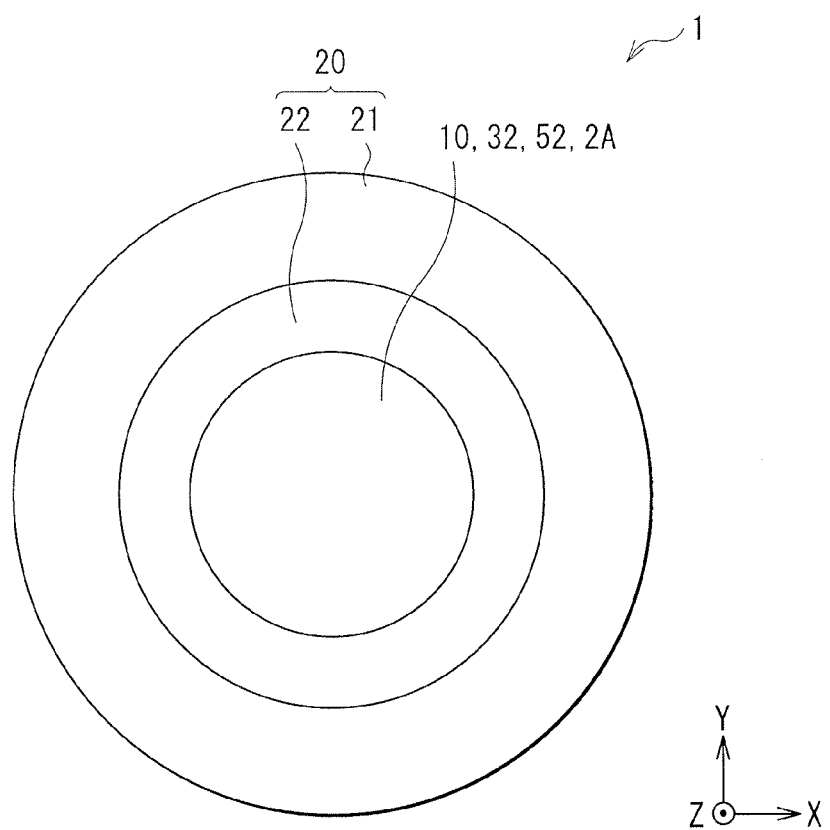
FIG. 5 is a plan view showing a configuration of the sintering apparatus illustrated in FIG. 4 that is viewed from the upside.

FIG. 4 shows a cross-sectional configuration of a sintering apparatus according to a first embodiment of the present disclosure, and FIG. 5 shows a planar configuration of the sintering apparatus illustrated in FIG. 4 that is viewed from the upside. This sintering apparatus 1 may be, for example, a hot pressing apparatus (pressurized heating furnace) that is used for manufacturing of a target material for the sputtering film formation, and may have, for example, a non-transportable section 2 and a transportable section 3.

The non-transportable section 2 may have, for example, a metallic pressure ram (pressure member) 2A to pressurize a material to be processed 10 inside a mold 20 to be hereinafter described, and a heating section 2B to heat the material to be processed 10 inside the mold 20. Further, the non-transportable section 2 has also a pedestal 2C on which the transportable section 3 is mounted. Component parts of the non-transportable section 2, that is, all of the pressure ram 2A, the heating section 2B, and the pedestal 2C are mounted and operated in the atmosphere. The pressure ram 2A and the heating section 2B out of the component parts of the non-transportable section 2 are capable of moving in a vertical direction, although they are not removed from the sintering apparatus 1. Accordingly, the pressure ram 2A and the heating section 2B are placed at an operating position illustrated in FIG. 4 at the sintering time, and are capable of temporarily moving upward to a retractable position (not shown in the drawing) that is above the operating position to refrain from interfering in mounting/dismounting of the transportable section 3.

The heating section 2B has a high-frequency induction coil 41 that performs induction heating of an outer surface 20A of an under-mentioned dice 21 of the mold 20. In other words, this sintering apparatus 1 is an open-type hot pressing apparatus adopting an atmospheric firing induction heating method.

The transportable section 3 has the mold 20 capable of accommodating the material to be processed 10 that is a material being sintered, and is loaded detachably with respect to the non-transportable section 2. An example of the material to be processed 10 may include powder that is served as a raw material for a sputtering target of a ceramic-based material, or a calcined material (sintered compact) thereof.

More specifically, the transportable section 3 has a main body 3A, and a metallic support base 3B on which the main body 3A is mounted. The main body 3A may have, for example, the mold 20, and a punch 30 for pressurizing the material to be processed 10 inside the mold 20.

The mold 20 may have, for example, an insert dice (inner mold) 22 that defines a planar shape of the material to be processed 10 inside the dice (outer mold) 21. The dice 21 may be, for example, a member in a hollow cylindrical shape, and has a function as an isobaric vessel for confining a pressure applied by the punch 30. In many cases, a dimension (outer diameter) of the dice 21 may be generally determined by a distance from an induction coil for induction heating, and a distance from a heater for heater heating. Therefore, when it is desired to form a sintered compact with a diameter smaller than an outer diameter of the dice 21, or when it is desired to form a rectangular sintered compact, the insert dice 22 is disposed inside the dice 21. When it doesn't matter that a size of the material to be processed 10 or a sintered compact to be fabricated is equivalent to an inner diameter of the dice 21, only the dice 21 may be used, and the insert dice 22 may not be used in some cases. The insert dice 22 is configured of one member or a combination of a plurality of members that is fitted into the dice 21 in a detachable manner, and various types of different shapes and dimensions are available to deal with any shape and dimension of the material to be processed 10. For example, when the material to be processed 10 or a sintered compact to be fabricated takes a circular form, the insert dice 22 may be configured of one cylindrical member as shown in FIG. 5. On the other hand, when the material to be processed 10 or a sintered compact to be fabricated takes a rectangular form, the insert dice 22 may be configured of a combination of a plurality of members (not shown in the drawing). The insert dice 22 is disposed in the dice 21 to form an opening that is slightly larger than an outside dimension of a sintered compact to be fabricated.

The punch 30 has a lower punch 31 and an upper punch 32 that are fitted into the insert dice 22 inside the dice 20, and the material to be processed 10 that is interposed between the lower punch 31 and the upper punch 32 is uniaxially pressurized in a vertical direction (Z direction in FIG. 4 and FIG. 5).

In the description given below, a pressure direction (vertical direction in FIG. 4) from the lower punch 31 and the upper punch 32 is defined as Z direction, and a plane orthogonal to the Z direction is defined as XY plane.

A lower spacer 33 for adjusting a thickness is provided between the lower punch 31 and the material to be processed 10. An upper spacer 34 for adjusting a thickness is provided between the upper punch 32 and the material to be processed 10. It is to be noted that, in some cases, a carbon-made sheet (not shown in the drawing) may be inserted between the material to be processed 10 and the lower spacer 33, between the material to be processed 10 and the upper spacer 34, at the inner side of the insert dice 22, or at any other location.

The component parts described thus far (the material to be processed 10, the dice 21, the insert dice 22, the lower punch 31, the upper punch 32, the lower spacer 33, and the upper spacer 34) may be preferably put in a high-temperature state uniformly at the sintering time. Therefore, the component parts excepting the material to be processed 10 are configured of a carbon material (more specifically, carbon graphite).

Further, the main body 3A has also a lower heat-insulating plate 51, an upper heat-insulating plate 52, and a heat-insulating material 53.

Each of the lower heat-insulating plate 51 and the upper heat-insulating plate 52 suppresses easy escaping of heat from the main body 3A to the metallic support base 3B or the pressure ram 2A by interposing the main body 3A between from top and bottom to assure the heat insulating properties. The lower heat-insulating plate 51 is provided between the lower punch 31 and the support base 3B. The upper heat-insulating plate 52 is mounted on the upper punch 32 in such a manner that the pressure ram 2A comes in contact with the top surface of the upper heat-insulating plate 52. Each of the lower heat-insulating plate 51 and the upper heat-insulating plate 52 may be made of, for example, a ceramic material.

The heat-insulating material 53 serves to suppress outward diffusion of heat that is produced on an outer surface of the dice 21, and is attached in a winding arrangement on the surfaces (side surfaces, top surfaces, and bottom surfaces) of members between the lower heat-insulating plate 51 and the upper heat-insulating plate 52, that is, the mold 20 and the punch 30. The heat-insulating material 53 may be configured of, for example, a ceramic fiber material.

Figure 6:
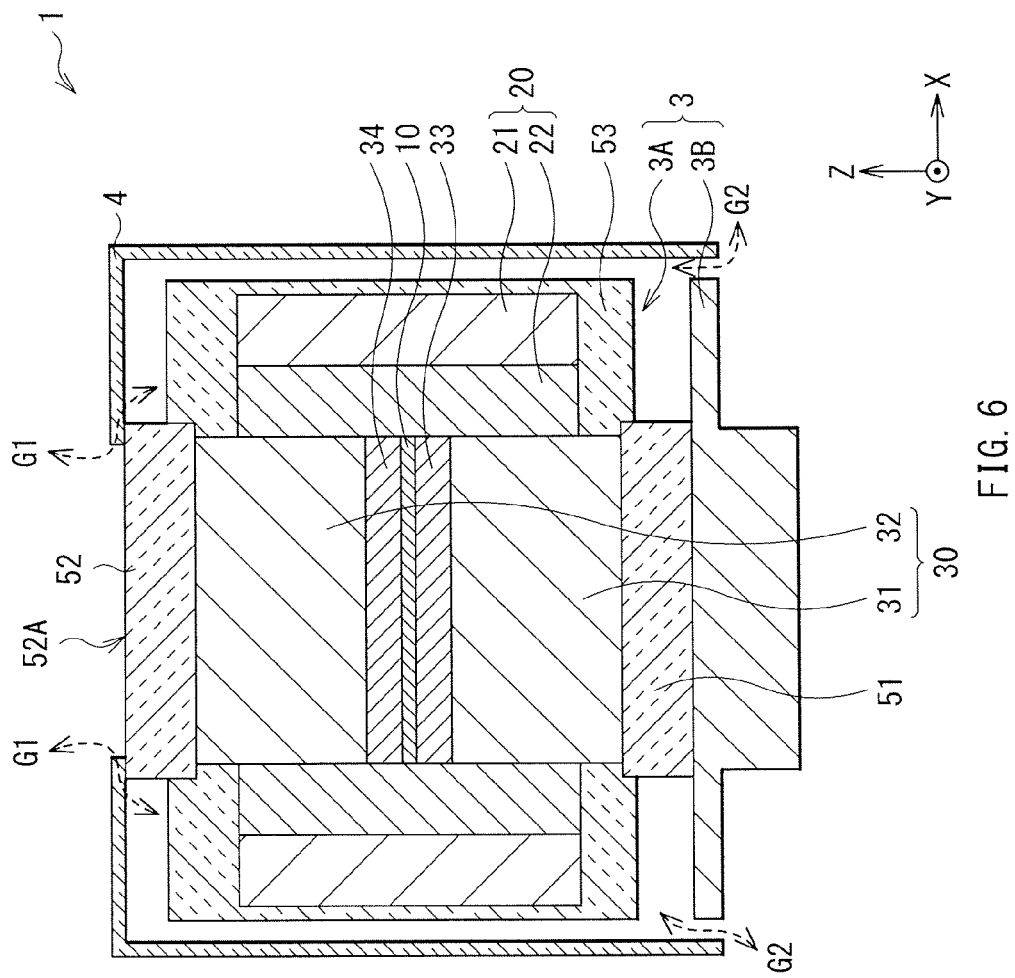
FIG. 6 is a cross-sectional view showing a state where a transportable section illustrated in FIG. 4 is separated from a fixing section.

Further, this sintering apparatus 1 has a covering member 4. The covering member 4 envelops the transportable section 3 loaded on the non-transportable section 2 in an almost hermetically sealed state, and allows the transportable section 3 to be separated from the non-transportable section 2 with the transportable section 3 enveloped in the almost hermetically sealed state as shown in FIG. 6. In the sintering apparatus 1, this makes it possible to maintain the high productivity, as well as to suppress consumption of the mold 20.

More specifically, because the covering member 4 envelops the transportable section 3 in the almost hermetically sealed state, the reaction of the mold 20 with oxygen in the air at high temperature at the sintering time is suppressed, which allows consumption of the mold 20 to be suppressed. Further, upon completion of the sintering, it is possible to separate the transportable section 3 from the non-transportable section 2 with the transportable section 3 enveloped by the covering member 4 in the almost hermetically sealed state to be moved to another location for cooling. This makes it possible to start the subsequent sintering immediately, leading to the improved productivity of an atmospheric pressure sintering mold being maintained.

The covering member 4 may be preferably supported in a suspending arrangement by the surface contact with the top surface of the main body 3A (that is, the top surface 52A of the upper heat-insulating plate 52), for example. Even when the material to be processed 10 is reduced in thickness in the course of progression of the sintering to cause lowering of the upper punch 32 and the upper heat-insulating plate 52, it is possible to maintain the airtightness by the own weight of the covering member 4.

For the property of the surface contact between the covering member 4 and the top surface of the main body 3A (that is, the top surface 52A of the upper heat-insulating plate 52), it may be preferable that the surface contact be made between plane surfaces as much as possible, and the contact area be large to minimize run-through of heated internal gas from a gap G1 between the covering member 4 and the top surface of the main body 3A (that is, the top surface 52A of the upper heat-insulating plate 52).

Further, an airflow-enabled gap G2 may be preferably provided between a bottom end of the covering member 4 and a side surface of the support base 3B. This makes it possible to minimize outflow/inflow of gas inside the covering member 4 from the gap G2, which allows breakage of the covering member 4 to be suppressed.

The gap G2 serves to ensure the minimum outflow/inflow of gas in association with expansion and contraction of internal gas, which makes it possible to suppress breakage of the covering member 4. The gap G2 may be, for example, about 0.5 mm in size. However, the size of the gap G2 is not limited to this value, and an optimal value may be different depending on a diameter and the effect of the overall sintering apparatus 1.

The covering member 4 may be preferably configured of, for example, quartz glass. This is because the quartz glass transmits infrared rays from a radiation thermometer 61 for measuring temperature of the mold 20 therethrough, and is excellent in the insulation property and heat resistance property. In addition, as an alternative, the covering member 4 may be configured of a quartz material that improves the heat-retaining property by containing air bubbles internally.

Figure 7:
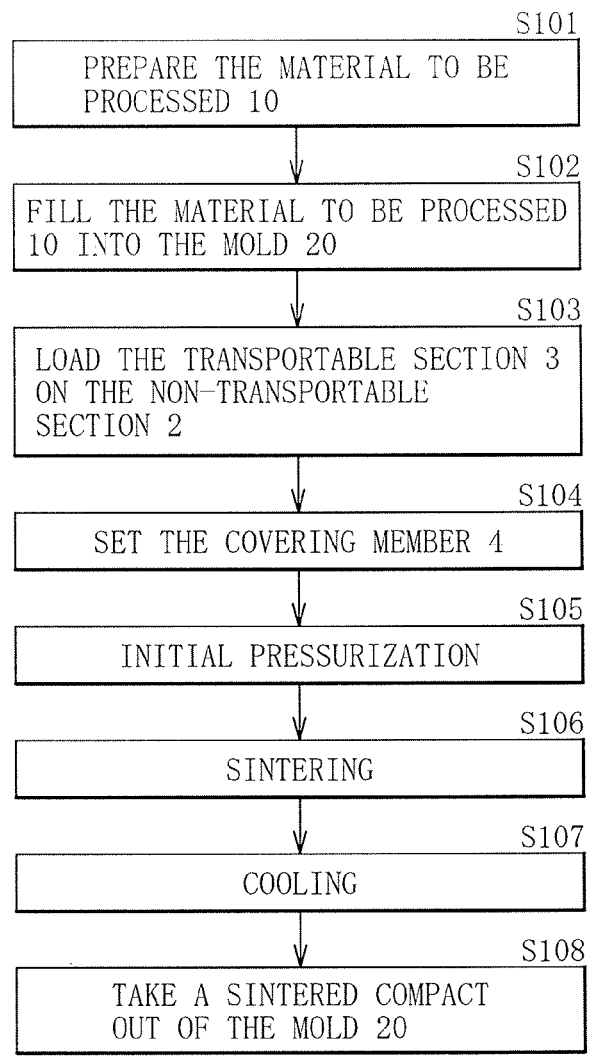
FIG. 7 is a flowchart showing a flow of a method of manufacturing a sintered compact using the sintering apparatus illustrated in FIG. 4.

FIG. 7 shows a flow of a method of manufacturing a sintered compact using the sintering apparatus 1.

First, the material to be processed 10 is prepared by mixing and drying main raw material powder and additive raw material powder, for example (step S101).

Next, the lower punch 31 and the lower spacer 33 are mounted in the mold 20, and the material to be processed 10 is filled into the mold 20, and then the upper spacer 34 and the upper punch 32 are placed thereon. This accommodates the material to be processed 10 in the mold 20 (step S102). The main body 3A is formed in such a manner that the punch 30 is interposed between the lower heat-insulating plate 51 and the upper heat-insulating plate 52 from top and bottom, and the heat-insulating material 53 is wound around the mold 20. The transportable section 3 is formed by placing this main body 3A on the support base 3B.

Afterward, the transportable section 3 is loaded on the non-transportable section 2 that is mounted in the atmosphere (step S103).

Subsequently, the transportable section 3 is covered with the covering member 4, and the transportable section 3 is enveloped by the covering member 4 in an almost hermetically sealed state as shown in FIG. 4 (step S104).

After covering of the transportable section 3 with the covering member 4, setting of the pressure ram 2A and the high-frequency induction coil 41 as well as axial (positional) adjustment is carried out simultaneously to complete setting of the covering member 4.

Thereafter, initial pressurization is performed by applying a pressure to the pressure ram 2A (step S105) to start heating. In such a manner, the material to be processed 10 in the transportable section 3 is pressurized and heated with the transportable section 3 enveloped by the covering member 4 in the almost hermetically sealed state to carry out the intended sintering process (step S106). On this occasion, temperature of the mold 20 is measured with the radiation thermometer 61. Since the covering member 4 is configured of a quartz material, this allows infrared rays from the radiation thermometer 61 to be transmitted therethrough.

Here, because the transportable section 3 loaded on the non-transportable section 2 is enveloped by the covering member 4 in the almost hermetically sealed state, the airflow between the inside and the outside of the covering member 4 is minimized, which suppresses reaction of the mold 20 with oxygen in the atmosphere at high temperature at the sintering time, resulting in consumption of the mold 20 being suppressed.

The covering member 4 may be supported in a suspending arrangement by the surface contact with the top surface of the main body 3A (that is, the top surface 52A of the upper heat-insulating plate 52), for example. This minimizes run-through of heated internal gas from the gap G1 between the covering member 4 and the top surface of the main body 3A (that is, the top surface 52A of the upper heat-insulating plate 52). Further, even when the material to be processed 10 is reduced in thickness in the course of progression of the sintering to cause lowering of the upper punch 32 and the upper heat-insulating plate 52, the surface contact between the covering member 4 and the top surface of the main body 3A (that is, the top surface 52A of the upper heat-insulating plate 52) is maintained by the own weight of the covering member 4, resulting in the airtightness being maintained.

The airflow-enabled gap G2 is provided between a bottom end of the covering member 4 and a side surface of the support base 3B. This ensures minimum outflow/inflow of gas inside the covering member 4 from the gap G2, which avoids breakage of the covering member 4.

Upon completion of the sintering (the "sintering" as is defined here refers to the intended pressurized heating. A cooling time when no pressurization is performed is not included.), cooling is carried out (step S107). When the sintering is carried out under vacuum or under a specific atmosphere, it is quite difficult to take out the material to be processed 10 or sintered compact from a vacuum container until temperature drops down to the temperature at which at least the above-described carbon-made component parts (the mold 20, the punch 30, and the like) do not get oxidized or a temperature zone at which a change in the atmosphere has no influence on the material to be processed 10 or sintered compact.

On the other hand, in a case of the atmospheric pressure sintering, the sintering is originally carried out under the air atmosphere, and thus the transportable section 3 does not have to be placed in the sintering apparatus 1 until cooling is completed after the sintering. Therefore, in this embodiment of the present disclosure, the pressure ram 2A and the high-frequency induction coil 41 are retracted to the upside once the sintering is completed, and as shown in FIG. 6, the transportable section 3 is separated from the non-transportable section 2 with the transportable section 3 enveloped by the covering member 4 in the almost hermetically sealed state to be moved to another location for cooling. This allows the subsequent sintering to be started immediately without causing the transportable section 3 under cooling for which the sintering has been already finished to occupy the sintering apparatus 1, leading to the improvement of the throughput capacity.

At the end of cooling, the sintered compact is taken out of the mold 20 (step S108). The steps described thus far complete the method of manufacturing the sintered compact according to this embodiment of the present disclosure.

Figure 8:
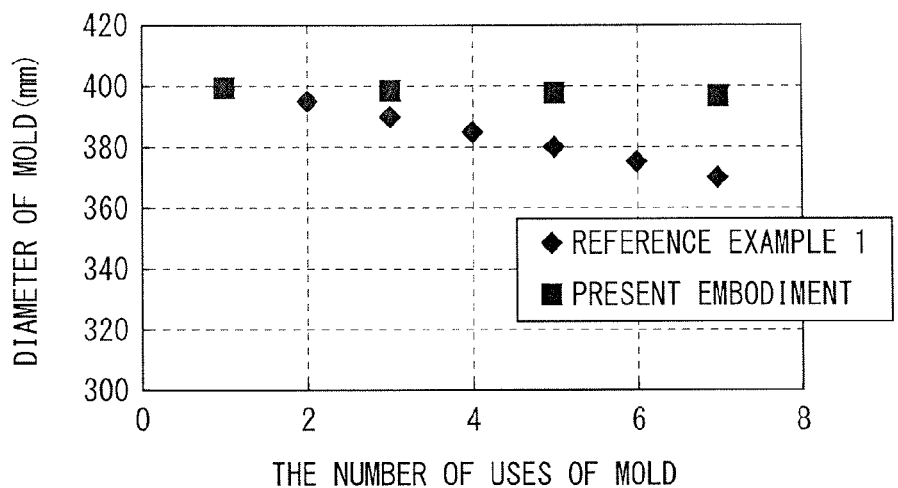
FIG. 8 is a graphic diagram showing an experimental result that examined a relationship between a diameter and the number of uses of a mold illustrated in FIG. 4.

In the same manner as the above-described manufacturing method, the sintering was repeated at temperature of about 1200 degrees centigrade using the sintering apparatus 1 illustrated in FIG. 4. FIG. 8 shows an experimental result that examined a relationship between a diameter and the number of uses of the mold 20 in this case. Further, FIG. 8 shows also an experimental result of the above-described reference example 1. As described above, the sintering apparatus 101 according to the reference example 1 has a configuration similar to that of the sintering apparatus 1 according to this embodiment of the present disclosure excepting that the covering member 4 is not provided.

As seen from FIG. 8, in this embodiment using the covering member 4, a degree of consumption of the mold 20 was reduced down to about one tenth of that in the reference example 1. It is supposed that this is because a pseudo hermetically-sealed space is formed that reduces a possibility that ambient air will flow into or pass through the covering member 4 easily or that is close to an enclosed space in a case where the pressurized sintering is performed under vacuum or under a controlled atmosphere.

In other words, it was found that if the transportable section 3 was enveloped by the covering member 4 in the almost hermetically sealed state at the sintering time, this made it possible to suppress reaction of the mold 20 with oxygen in the atmosphere at high temperature at the sintering time, resulting in consumption of the mold 20 being suppressed.

Figure 9:
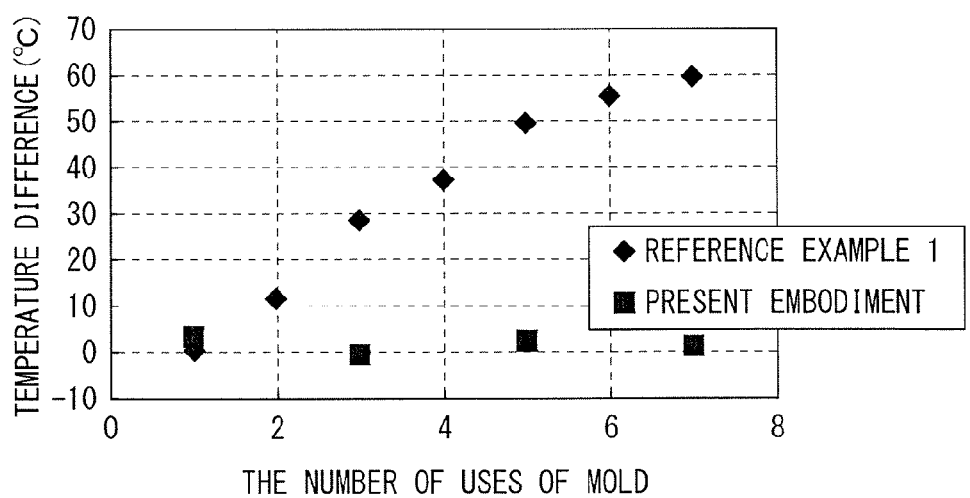
FIG. 9 is a graphic diagram showing an experimental result that examined a relationship between a temperature difference in a central part after passage of a given length of time and the number of uses of the mold illustrated in FIG. 4.

For the temperature in the vicinity of a central part of the mold 20 after passage of a given length of time in the above-described sintering experiment, FIG. 9 shows a result that examined a difference between any of the temperature from a second time on and the temperature at a first time out of the number of uses of the mold 20 when the temperature at the first time is used as a reference. Further, FIG. 9 shows also an experimental result of the above-described reference example 1.

As seen from FIG. 9, in this embodiment using the covering member 4, the temperature in the vicinity of a central part of the mold 20 hardly varied after the sintering was carried out several times. In other words, it was found that if the transportable section 3 was enveloped by the covering member 4 in the almost hermetically sealed state at the sintering time, it was possible to make temperature histories almost identical to one another irrespective of the number of times of the sintering. Consequently, it is expected that the controllability and uniformity of the density, crystallinity, composition, and the like of the sintered compact obtained by sintering the material to be processed 10 inside the mold 20 will be improved.

(Target)

Figure 10:
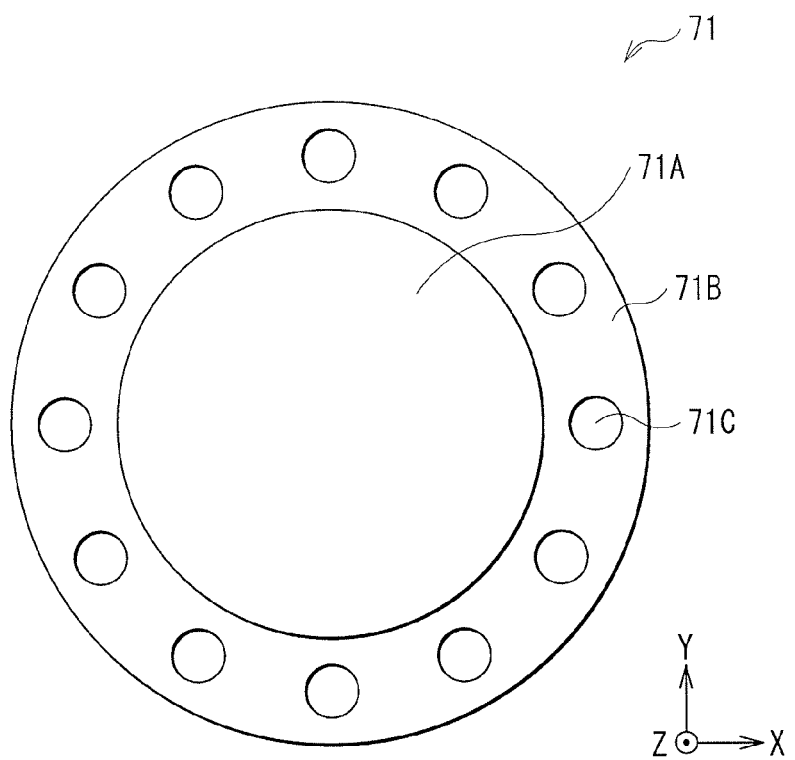
FIG. 10 is a plan view showing an example of a target manufactured by the method of manufacturing a sintered compact that is illustrated in FIG. 7.

FIG. 10 shows an example of a planar configuration of a target having a target material manufactured by using the sintering apparatus 1 illustrated in FIG. 4. This target 71 is used for the sputtering film formation in a manufacturing process for a semiconductor device and a flat panel display unit, and has a configuration in which a target material 71A is attached to a backing plate (backboard) 71B using a bonding material (not shown in the drawing).

This target material 71A is manufactured by the method of manufacturing a sintered compact that is illustrated in FIG. 7. More specifically, the target material 71A is manufactured in such a manner that the transportable section 3 having the mold 20 accommodating the material to be processed 10 including a target raw material is loaded on the non-transportable section 2 that is mounted in the atmosphere, and thereafter the material to be processed 10 in the mold 20 is pressurized and heated with the transportable section 3 enveloped by the covering member 4 in the almost hermetically sealed state. This allows the target material 71A to reduce costs because of the high productivity and suppression of consumption of the mold 20. Further, since the target material 71A is sintered inside a pseudo hermetically-sealed space that is formed by the covering member 4, the controllability and uniformity of the density, crystallinity, composition, and the like are improved.

The backing plate 71B may be configured of, for example, copper (Cu). Mounting screw holes 71C are provided around the circumferential area of the backing plate 71B. The bonding material may be configured of, for example, indium (In).

Figure 11:
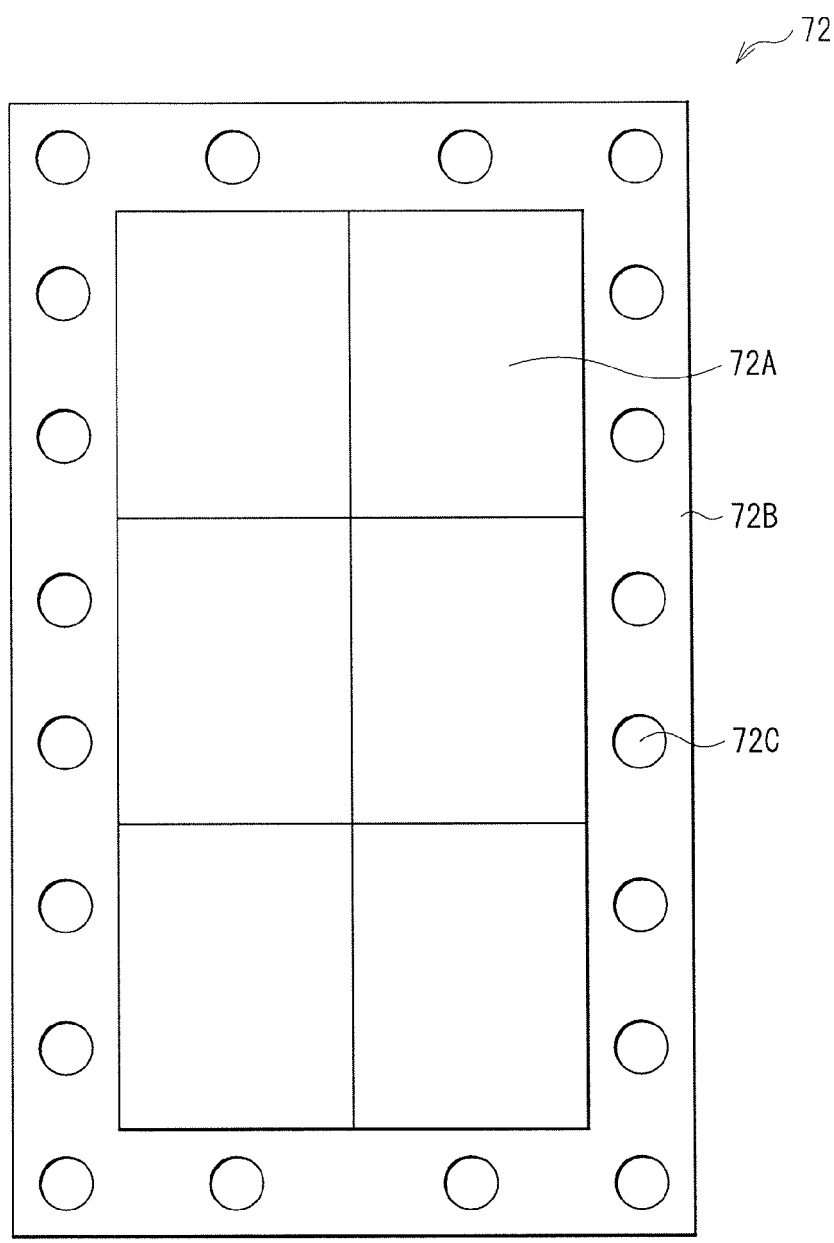
FIG. 11 is a plan view showing another example of the target.

It is to be noted that a shape each of the target material 71A and the target 71 is not limited to a circular form as shown in FIG. 10, and another shape such as a rectangular form may be also permitted. FIG. 11 shows another example of a planar configuration of the target. This target 72 has a configuration in which a number of pieces (for example, four pieces) of rectangular target material 72A are attached to a backing plate (backboard) 72B using a bonding material (not shown in the drawing). The target materials 72A are laid side-by-side at small spacing intervals (for example, less than about 1 mm) to the degree of absorbing the thermal expansion of the target materials 72A. Except for such a matter, the target 72 is similar to the target 71 illustrated in FIG. 10.

As described above, in the sintering apparatus 1 according to this embodiment, there is provided the covering member 4, and this covering member 4 envelops the transportable section 3 loaded on the non-transportable section 2 in the almost hermetically sealed state and allows the transportable section 3 to be separated from the non-transportable section 2 with the transportable section 3 enveloped in the almost hermetically sealed state. Further, in the method of manufacturing a sintered compact according to this embodiment, the material to be processed 10 in the mold 20 is pressurized and heated with the transportable section 3 enveloped by the covering member 4 in the almost hermetically sealed state, and thereafter the transportable section 3 is separated from the non-transportable section 2 with the transportable section 3 enveloped in the almost hermetically sealed state. As described above, by covering the transportable section 3 in a manner to cover the transportable section 3 with the covering member 4, a transportable and almost hermetically sealed space is formed in the periphery of the transportable section 3. This makes it possible to maintain high productivity and to suppress consumption of the mold 20.

The target materials 71A and 72A in this embodiment are manufactured by pressurizing and heating the material to be processed 10 in the mold 20 with the transportable section 3 enveloped by the covering member 4 in the almost hermetically sealed state. This suppresses consumption of the mold 20 while keeping the productivity, which allows the cost reduction to be achieved. Further, it is possible to improve the controllability and uniformity of the density, crystallinity, composition, and the like, resulting in the high-performance and high-quality target materials 71A and 72A being obtained.

Second Embodiment

Figure 12:
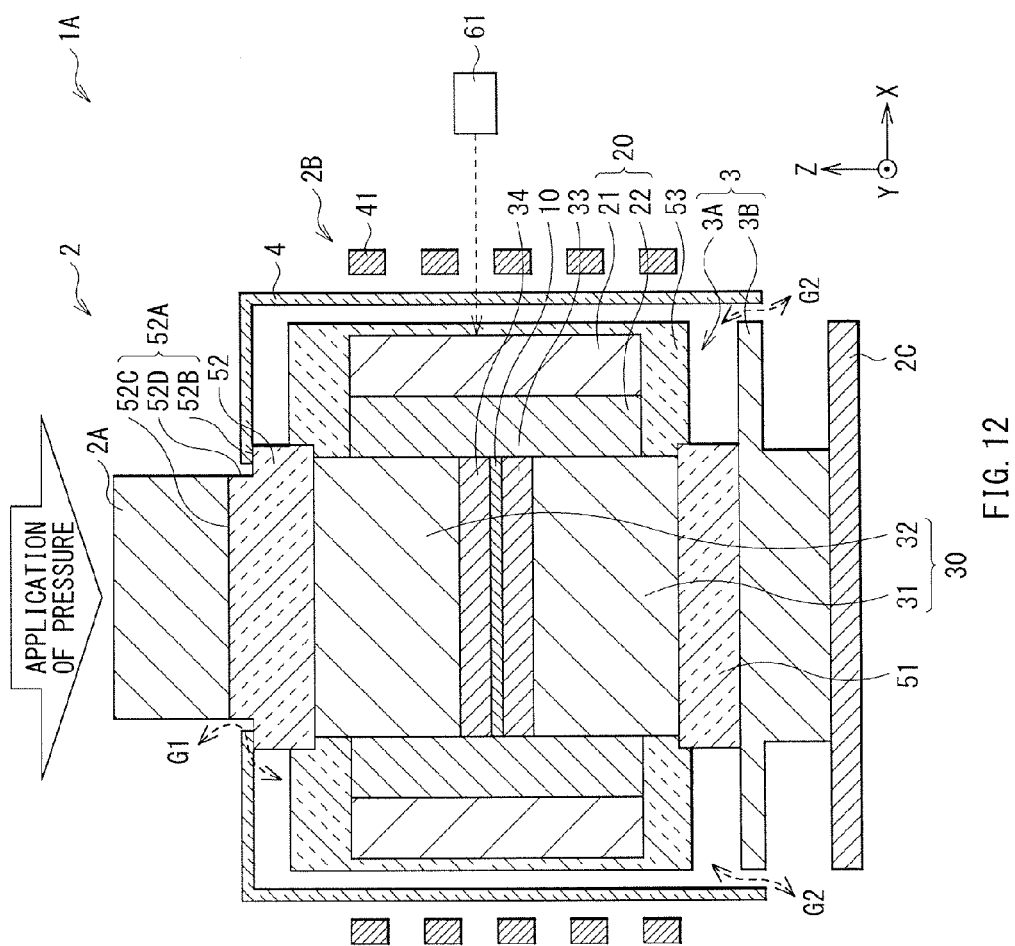
FIG. 12 is a cross-sectional view showing a configuration of a sintering apparatus according to a second embodiment of the present disclosure.

FIG. 12 shows a cross-sectional configuration of a sintering apparatus 1A according to a second embodiment of the present disclosure. This embodiment represents that a step is provided on the top surface of the main body 3A (the top surface 52A of the upper heat-insulating plate 52) in the above-described first embodiment. With the exception of this point, the sintering apparatus 1A has a configuration, a function, and effects similar to those of the sintering apparatus 1 according to the above-described first embodiment. Therefore, the description is provided in such a manner that any component parts essentially same as those of the sintering apparatus 1 according to the above-described first embodiment are denoted with the same reference numerals.

The non-transportable section 2 is configured in the same manner as with the first embodiment.

The component parts other than the upper heat-insulating plate 52 of the transportable section 3 are configured in the same manner as with the first embodiment.

Figure 13:
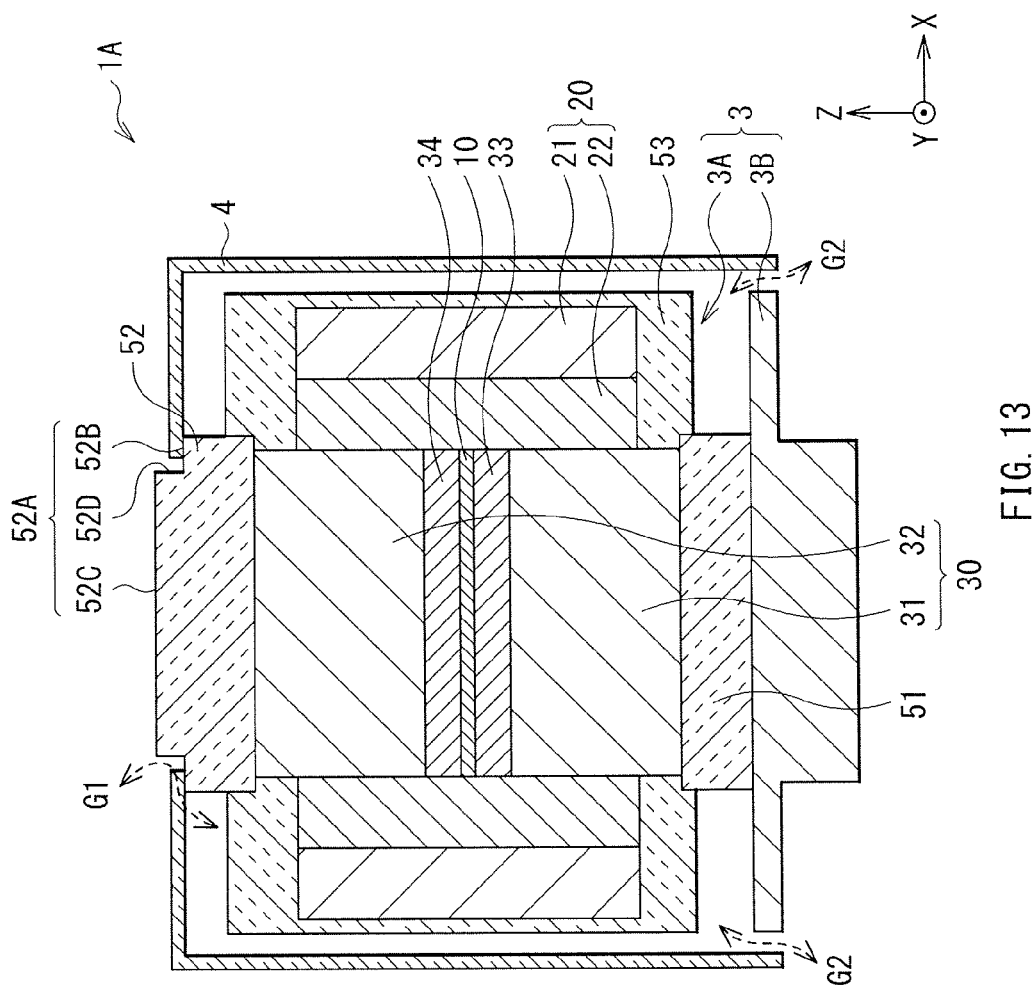
FIG. 13 is a cross-sectional view showing a state where a transportable section illustrated in FIG. 12 is separated from a fixed section.

As with the first embodiment, this sintering apparatus 1A has a covering member 4. As is the case in the first embodiment, the covering member 4 envelops the transportable section 3 loaded on the non-transportable section 2 in an almost hermetically sealed state, and allows the transportable section 3 to be separated from the non-transportable section 2 with the transportable section 3 enveloped in the almost hermetically sealed state as shown in FIG. 13. In the sintering apparatus 1A, this makes it possible to maintain the high productivity, as well as to suppress consumption of the mold 20 as with the first embodiment.

As is the case in the first embodiment, the covering member 4 is supported in a suspending arrangement by the surface contact with the top surface of the main body 3A (that is, the top surface 52A of the upper heat-insulating plate 52). Between a bottom end of the covering member 4 and a side surface of the support base 3B, an airflow-enabled gap G2 is provided as with the first embodiment.

The top surface of the main body 3A (that is, the top surface 52A of the upper heat-insulating plate 52) has a step 52D between an outer circumferential part 52B that comes in surface contact with the covering member 4 and an inner circumferential part 52C on an inner side further from the outer circumferential part 52B. A relative positional relationship of the covering member 4 with respect to the top surface of the main body 3A is defined by the step 52D. Each of the outer circumferential part 52B and the inner circumferential part 52C takes a concentric planar shape. In the sintering apparatus 1A, this facilitates positioning of the covering member 4 on the top surface of the main body 3A. Therefore, for example, in covering the transportable section 3 with the covering member 4, it becomes easy to make the small gap G2 between a bottom end of the covering member 4 and a side surface of the support base 3B. In addition, for example, in moving the transportable section 3 covered with the covering member 4 at the end of the sintering, a positional shift of the covering member 4 is avoided.

A height of the step 52D (a difference in height between the outer circumferential part 52B and the inner circumferential part 52C) does not have to be large, but any thickness that enables positioning of the covering member 4 may be acceptable, and a height that is approximately equal to or larger than a thickness of the covering member 4 may be sufficient.

Third Embodiment

Figure 14:
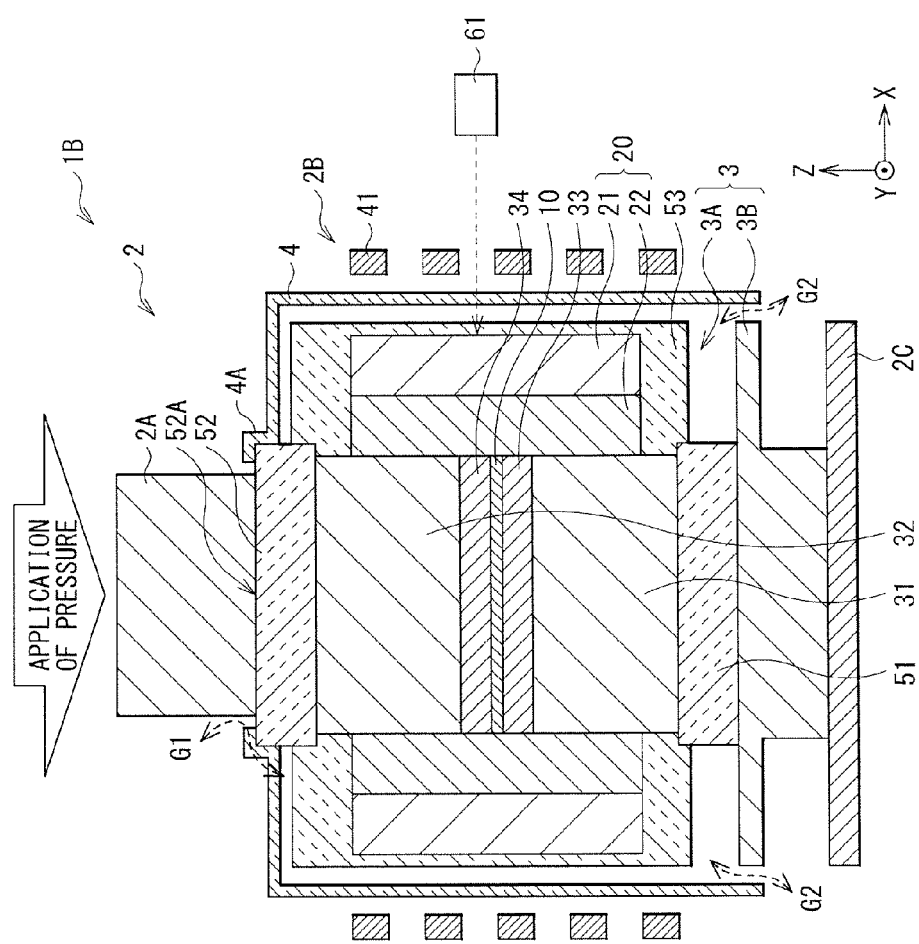
FIG. 14 is a cross-sectional view showing a configuration of a sintering apparatus according to a third embodiment of the present disclosure.

FIG. 14 shows a cross-sectional configuration of a sintering apparatus 1B according to a third embodiment of the present disclosure. This embodiment represents that the covering member 4 is provided with a step 4A that follows a corner of the top surface of the main body 3A (the top surface 52A of the upper heat-insulating plate 52) in the above-described first embodiment. With the exception of this point, the sintering apparatus 1B has a configuration, a function, and effects similar to those of the sintering apparatus 1 according to the above-described first embodiment. Therefore, the description is provided in such a manner that any component parts essentially same as those of the sintering apparatus 1 according to the above-described first embodiment are denoted with the same reference numerals.

The non-transportable section 2 and the transportable section 3 are configured in the same manner as with the first embodiment.

Figure 15:
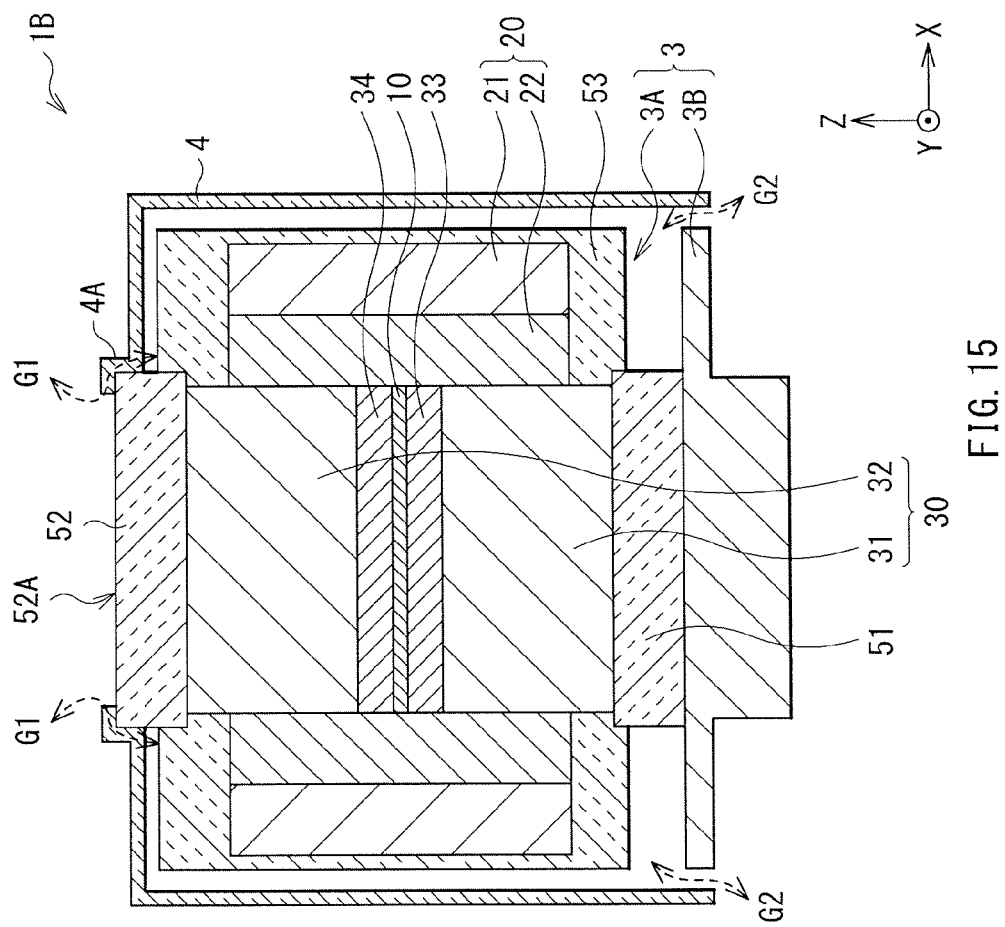
FIG. 15 is a cross-sectional view showing a state where a transportable section illustrated in FIG. 14 is separated from a fixed section.

As with the first embodiment, this sintering apparatus 1B has a covering member 4. As is the case in the first embodiment, the covering member 4 envelops the transportable section 3 loaded on the non-transportable section 2 in an almost hermetically sealed state, and allows the transportable section 3 to be separated from the non-transportable section 2 with the transportable section 3 enveloped in the almost hermetically sealed state as shown in FIG. 15. In the sintering apparatus 1B, this makes it possible to maintain the high productivity, as well as to suppress consumption of the mold 20 as with the first embodiment.

As is the case in the first embodiment, the covering member 4 is supported in a suspending arrangement by the surface contact with the top surface of the main body 3A (that is, the top surface 52A of the upper heat-insulating plate 52). Between a bottom end of the covering member 4 and a side surface of the support base 3B, an airflow-enabled gap G2 is provided as with the first embodiment.

The covering member 4 has the step 4A that follows a corner of the top surface of the main body 3A (that is, the top surface 52A of the upper heat-insulating plate 52). A relative positional relationship of the covering member 4 with respect to the top surface of the main body 3A is defined by the step 4A. In the sintering apparatus 1B, this facilitates positioning of the covering member 4 on the top surface of the main body 3A. Therefore, for example, in covering the transportable section 3 with the covering member 4, it becomes easy to make the small gap G2 between a bottom end of the covering member 4 and a side surface of the support base 3B. In addition, for example, in moving the transportable section 3 covered with the covering member 4 at the end of the sintering, a positional shift of the covering member 4 is avoided. This is preferred especially when it is difficult to provide the step 52D on the top surface 52A of the upper heat-insulating plate 52 for some reason or other.

A height of the step 4A does not have to be large, but any thickness that enables positioning of the covering member 4 may be acceptable, and a height that is approximately equal to or larger than a thickness of the covering member 4 may be sufficient.

Fourth Embodiment

Figure 16:
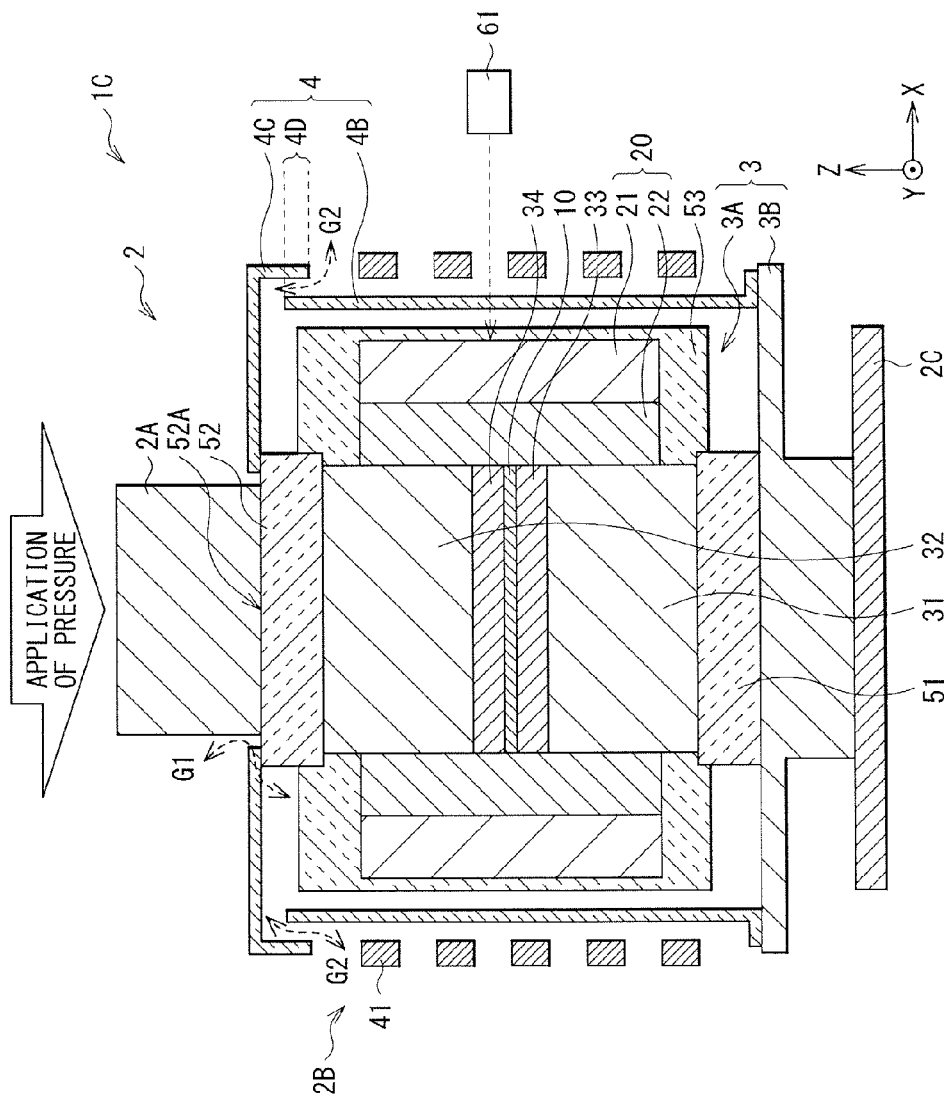
FIG. 16 is a cross-sectional view showing a configuration of a sintering apparatus according to a fourth embodiment of the present disclosure.

FIG. 16 shows a cross-sectional configuration of a sintering apparatus 1C according to a fourth embodiment of the present disclosure. In this embodiment, the covering member 4 is configured in a two-piece arrangement, and a tubular lower covering member 4B is covered with a tectiform upper covering member 4C. With the exception of this point, the sintering apparatus 1C has a configuration, a function, and effects similar to those of the sintering apparatus 1 according to the above-described first embodiment. Therefore, the description is provided in such a manner that any component parts essentially same as those of the sintering apparatus 1 according to the above-described first embodiment are denoted with the same reference numerals.

The non-transportable section 2 and the transportable section 3 are configured in the same manner as with the first embodiment.

Figure 17:
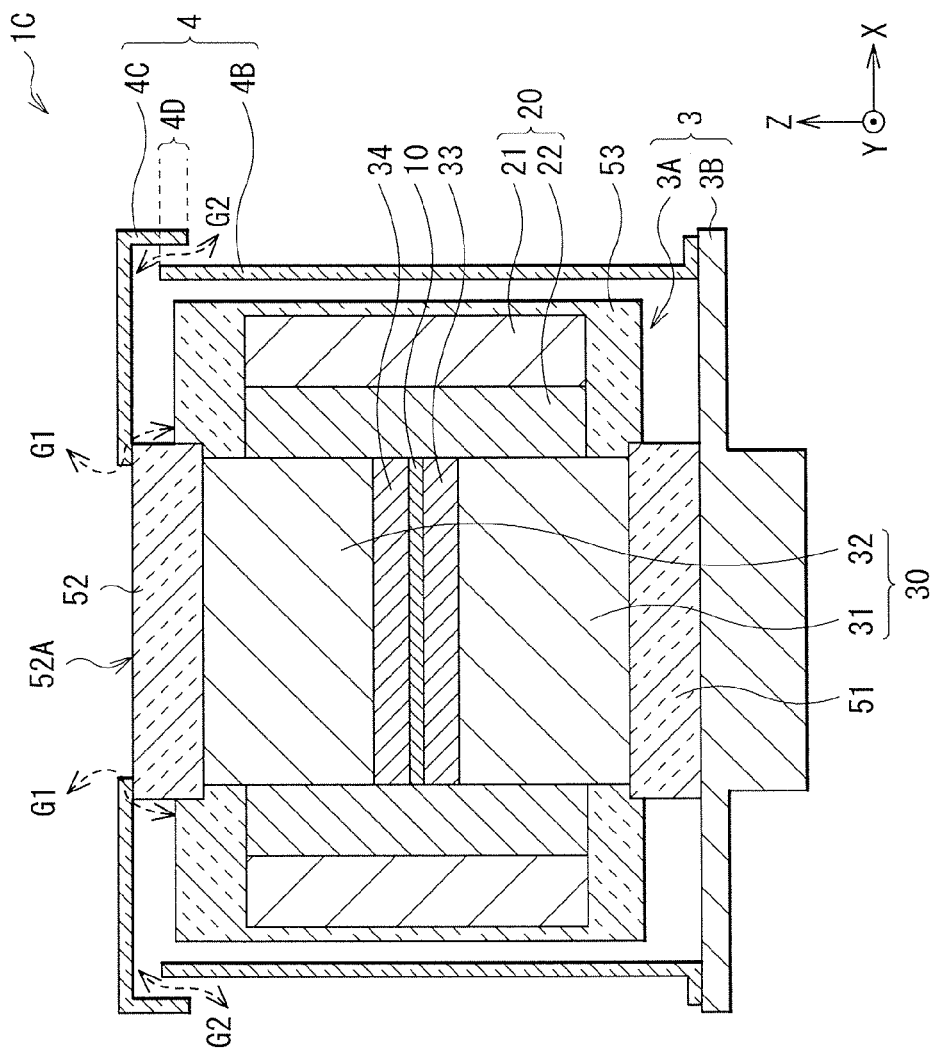
FIG. 17 is a cross-sectional view showing a state where a transportable section illustrated in FIG. 16 is separated from a fixed section.

As with the first embodiment, this sintering apparatus 1C has a covering member 4. As is the case in the first embodiment, the covering member 4 envelops the transportable section 3 loaded on the non-transportable section 2 in an almost hermetically sealed state, and allows the transportable section 3 to be separated from the non-transportable section 2 with the transportable section 3 enveloped in the almost hermetically sealed state as shown in FIG. 17. In the sintering apparatus 1C, this makes it possible to maintain the high productivity, as well as to suppress consumption of the mold 20 as with the first embodiment.

The covering member 4 has a configuration that is divided into two parts of the lower covering member 4B and the upper covering member 4C. The lower covering member 4B is supported by the surface contact with the support base 3B. The upper covering member 4C is supported in a suspending arrangement by the surface contact with the top surface of the main body 3A (the top surface 52A of the upper heat-insulating plate 52). Between the lower covering member 4B and the upper covering member 4C, an airflow-enabled gap G2 is provided. Such a two-piece configuration of the covering member 4 makes it possible to reduce a size of the covering member 4 and to facilitate manufacturing of the covering member 4. Further, as compared with a case where the overall covering member 4 is supported in a suspending arrangement by the surface contact with the top surface of the main body 3A (the top surface 52A of the upper heat-insulating plate 52), it is possible to assure the durability while reducing the covering member 4 in thickness.

The lower covering member 4B is placed on the support base 3B to form a cylindrical wall surface. For the property of the surface contact between the lower covering member 4B and the support base 3B, it may be preferable that the surface contact be made between plane surfaces as much as possible, and the contact area be large to minimize run-through of heated internal gas from a gap G1 between the lower covering member 4B and the support base 3B.

The upper covering member 4C has a central part that is a hollow disk-shaped member to pass the pressure ram 2A therethrough. An outer circumferential part of the upper covering member 4C is folded back at the outside of the lower covering member 4B.

As described above, the upper covering member 4C may be preferably supported in a suspending arrangement by the surface contact with the top surface of the main body 3A (that is, the top surface 52A of the upper heat-insulating plate 52). Even when the material to be processed 10 is reduced in thickness in the course of progression of the sintering to cause lowering of the upper punch 32 and the upper heat-insulating plate 52, it is possible to maintain the airtightness by the own weight of the upper covering member 4C.

The upper covering member 4C and the lower covering member 4B have a dual part 4D in which they overlap with each other along the side surface of the main body 3A. A gap G2 is provided between the upper covering member 4C and the lower covering member 4B at the dual part 4D.

The gap G2 serves to ensure the minimum outflow/inflow of gas in association with expansion and contraction of internal gas, which makes it possible to suppress breakage of the covering member 4. The gap G2 may be, for example, about 0.5 mm in size. However, the size of the gap G2 is not limited to this value, and an optimal value may be different depending on a diameter and the effect of the overall sintering apparatus 1C.

Fifth Embodiment

Figure 18:
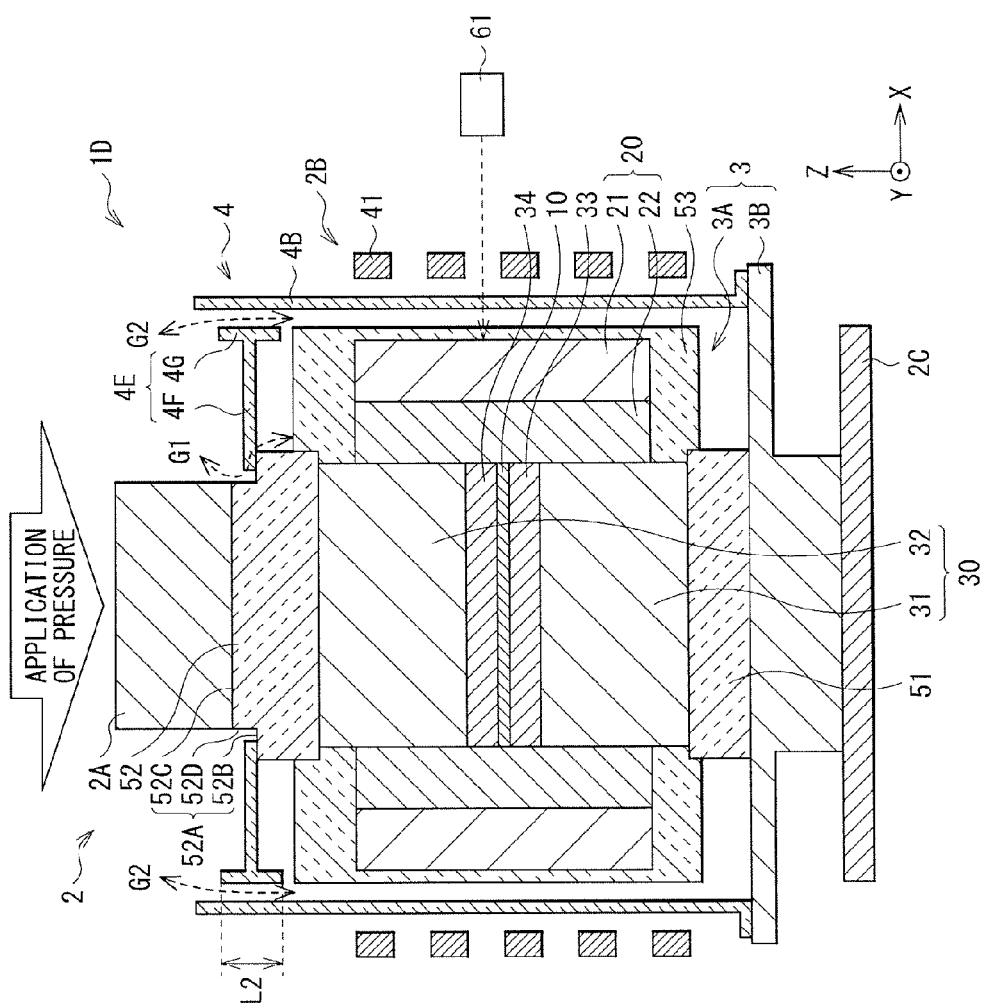
FIG. 18 is a cross-sectional view showing a configuration of a sintering apparatus according to a fifth embodiment of the present disclosure.

FIG. 18 shows a cross-sectional configuration of a sintering apparatus 1D according to a fifth embodiment of the present disclosure. In this embodiment, the covering member 4 is configured in a two-piece arrangement, and a disk-shaped upper covering member 4E is loosely fitted to a tubular lower covering member 4B. With the exception of this point, the sintering apparatus 1D has a configuration, a function, and effects similar to those of the sintering apparatus 1 according to the above-described first embodiment. Therefore, the description is provided in such a manner that any component parts essentially same as those of the sintering apparatus 1 according to the above-described first embodiment are denoted with the same reference numerals.

The non-transportable section 2 and the transportable section 3 are configured in the same manner as with the first embodiment.

Figure 19:
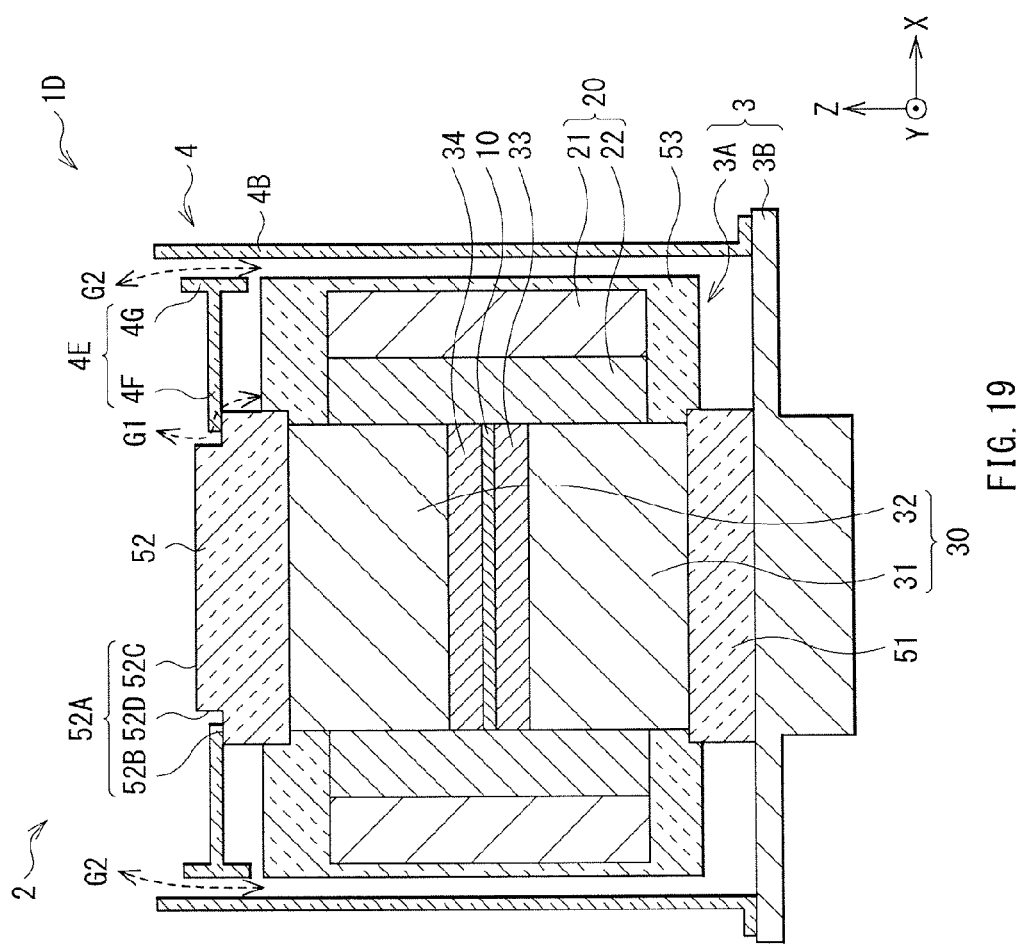
FIG. 19 is a cross-sectional view showing a state where a transportable section illustrated in FIG. 18 is separated from a fixed section.

As with the first embodiment, this sintering apparatus 1D has a covering member 4. As is the case in the first embodiment, the covering member 4 envelops the transportable section 3 loaded on the non-transportable section 2 in an almost hermetically sealed state, and allows the transportable section 3 to be separated from the non-transportable section 2 with the transportable section 3 enveloped in the almost hermetically sealed state as shown in FIG. 19. In the sintering apparatus 1D, this makes it possible to maintain the high productivity, as well as to suppress consumption of the mold 20 as with the first embodiment.

As with the fourth embodiment, the covering member 4 has a configuration that is divided into two parts of the lower covering member 4B and the upper covering member 4E. The lower covering member 4B is supported by the surface contact with the support base 3B. The upper covering member 4E is supported in a suspending arrangement by the surface contact with the top surface of the main body 3A (the top surface 52A of the upper heat-insulating plate 52). Between the lower covering member 4B and the upper covering member 4E, an airflow-enabled gap G2 is provided. Such a two-piece configuration of the covering member 4 makes it possible to reduce a size of the covering member 4 and to facilitate manufacturing of the covering member 4. Further, as compared with a case where the overall covering member 4 is supported in a suspending arrangement by the surface contact with the top surface of the main body 3A, it is possible to assure the durability while reducing the covering member 4 in thickness.

The lower covering member 4B is configured in the same manner as with the first embodiment.

The upper covering member 4E has a disk part 4F that comes in surface contact with the top surface of the main body 3A (the top surface 52A of the upper heat-insulating plate 52), and a flange part 4G that is provided vertically with respect to the disk part 4F at an outer end of the disk part 4F. A gap G2 is provided between the flange part 4G and the lower covering member 4B. Therefore, when the material to be processed 10 is reduced in thickness in the course of progression of the sintering, it is possible to relax the restriction concerning a relationship between the contraction amount of the material to be processed 10 and a size of the lower covering member 4B.

More specifically, the contraction amount of the material to be processed 10 depends on material types, the filling amount, or the number of pieces of the material to be processed 10, and it is more likely that the contraction amount will become larger with an increase in the material types, the filling amount, or the number of pieces of the material to be processed 10. Accordingly, a size of the lower covering member 4B may be preferably changed depending on whether the number of pieces of the material to be processed 10 is small or large. Further, there could be a concern about a possibility that the amount of overlapping between the flange part 4G of the upper covering member 4E and the lower covering member 4B in the Z direction, that is, a length L2 of the gap G2 will vary with change in the contraction amount of the material to be processed 10, causing a conductance governing outflow/inflow of gas to vary.

In this embodiment, the gap G2 is provided on the inner wall side of the lower covering member 4B, that is, between the flange part 4G and the lower covering member 4B, which makes it possible to reduce variation in the conductance of the gap G2 independently of the amount or the number of pieces of the material to be processed 10.

Sixth Embodiment

Figure 20:
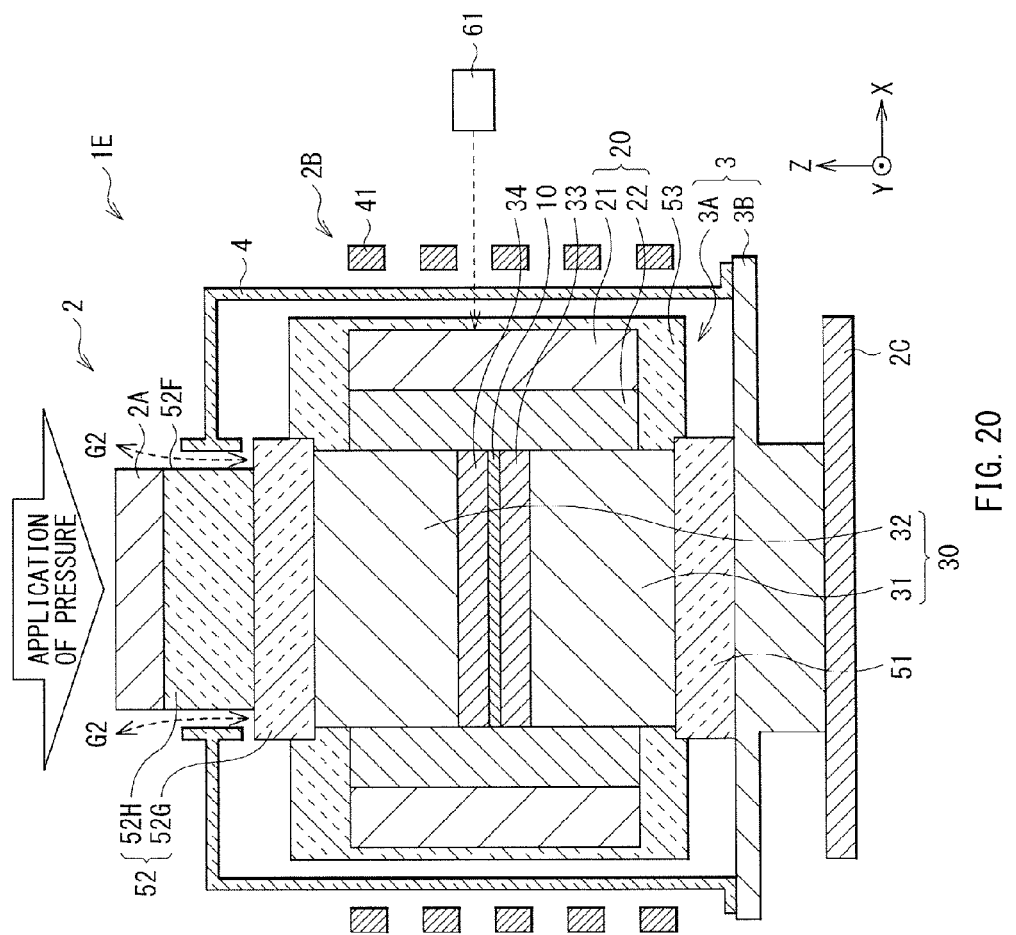
FIG. 20 is a cross-sectional view showing a configuration of a sintering apparatus according to a sixth embodiment of the present disclosure.

FIG. 20 shows a cross-sectional configuration of a sintering apparatus 1E according to a sixth embodiment of the present disclosure. In this embodiment, the covering member 4 is supported by the surface contact with the support base 3B, and a gap G2 is provided between the covering member 4 and the side surface of the main body 3A (the side surface 52F of the upper heat-insulating plate 52). With the exception of this point, the sintering apparatus 1E has a configuration, a function, and effects similar to those of the sintering apparatus 1 according to the above-described first embodiment. Therefore, the description is provided in such a manner that any component parts essentially same as those of the sintering apparatus 1 according to the above-described first embodiment are denoted with the same reference numerals.

The non-transportable section 2 is configured in the same manner as with the first embodiment.

The component parts other than the upper heat-insulating plate 52 of the transportable section 3 are configured in the same manner as with the first embodiment.

Figure 21:
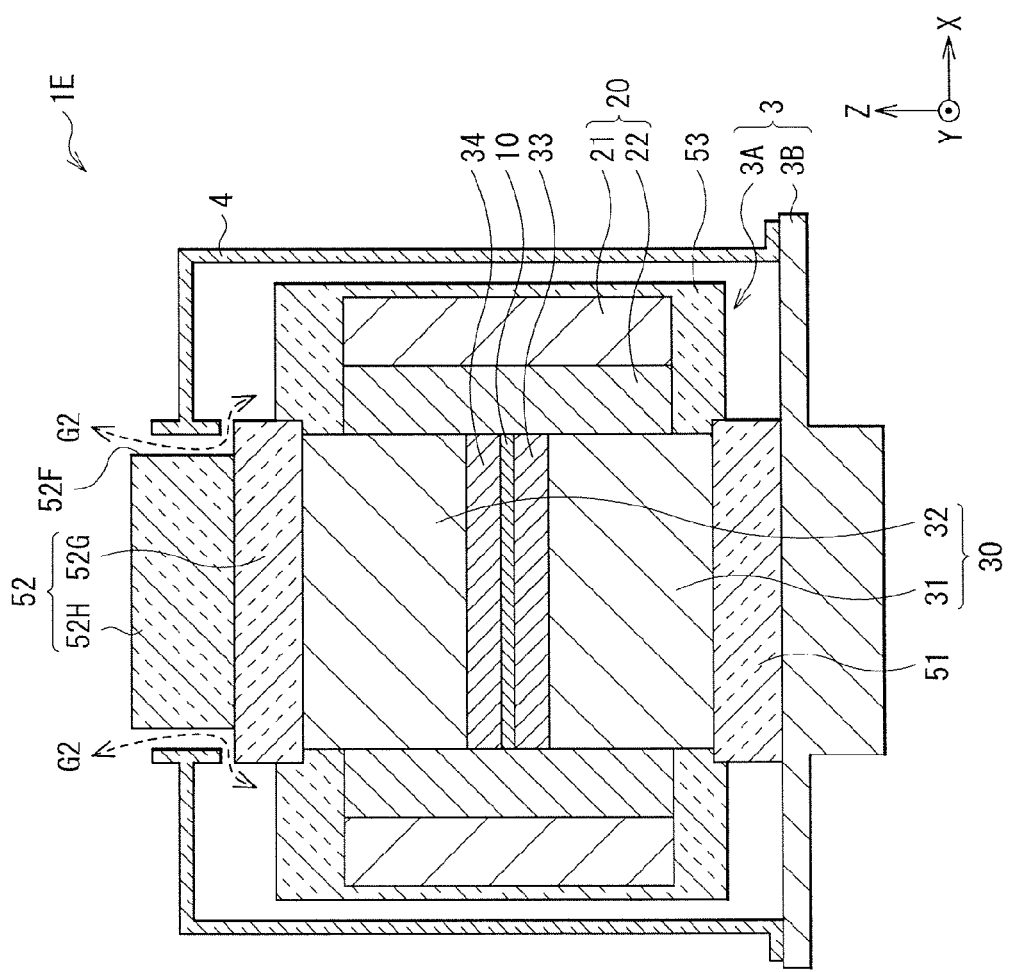
FIG. 21 is a cross-sectional view showing a state where a transportable section illustrated in FIG. 20 is separated from a fixed section.

As with the first embodiment, this sintering apparatus 1E has a covering member 4. As is the case in the first embodiment, the covering member 4 envelops the transportable section 3 loaded on the non-transportable section 2 in an almost hermetically sealed state, and allows the transportable section 3 to be separated from the non-transportable section 2 with the transportable section 3 enveloped in the almost hermetically sealed state as shown in FIG. 21. In the sintering apparatus 1E, this makes it possible to maintain the high productivity, as well as to suppress consumption of the mold 20 as with the first embodiment.

The covering member 4 is supported by the surface contact with the support base 3B. Between the covering member 4B and the side surface of the main body 3A (the side surface 52F of the upper heat-insulating plate 52), an airflow-enabled gap G2 is provided. Therefore, although the covering member 4 adopts a single-piece configuration as is the case in the first embodiment, it is possible to alleviate a burden on the support of the covering member 4 as compared with a case where the covering member 4 is supported in a suspending arrangement on the top surface of the main body 3A (the top surface 52A of the upper heat-insulating plate 52).

To form the gap G2, the upper heat-insulating plate 52 may be preferably made larger in thickness as compared with a case of the first embodiment. Alternatively, as shown in FIG. 20 and FIG. 21, the upper heat-insulating plate 52 may be preferably formed in a laminated configuration stacking two or more pieces of a first upper heat-insulating plate 52G and a second upper heat-insulating plate 52H.

Seventh Embodiment

Figure 22:
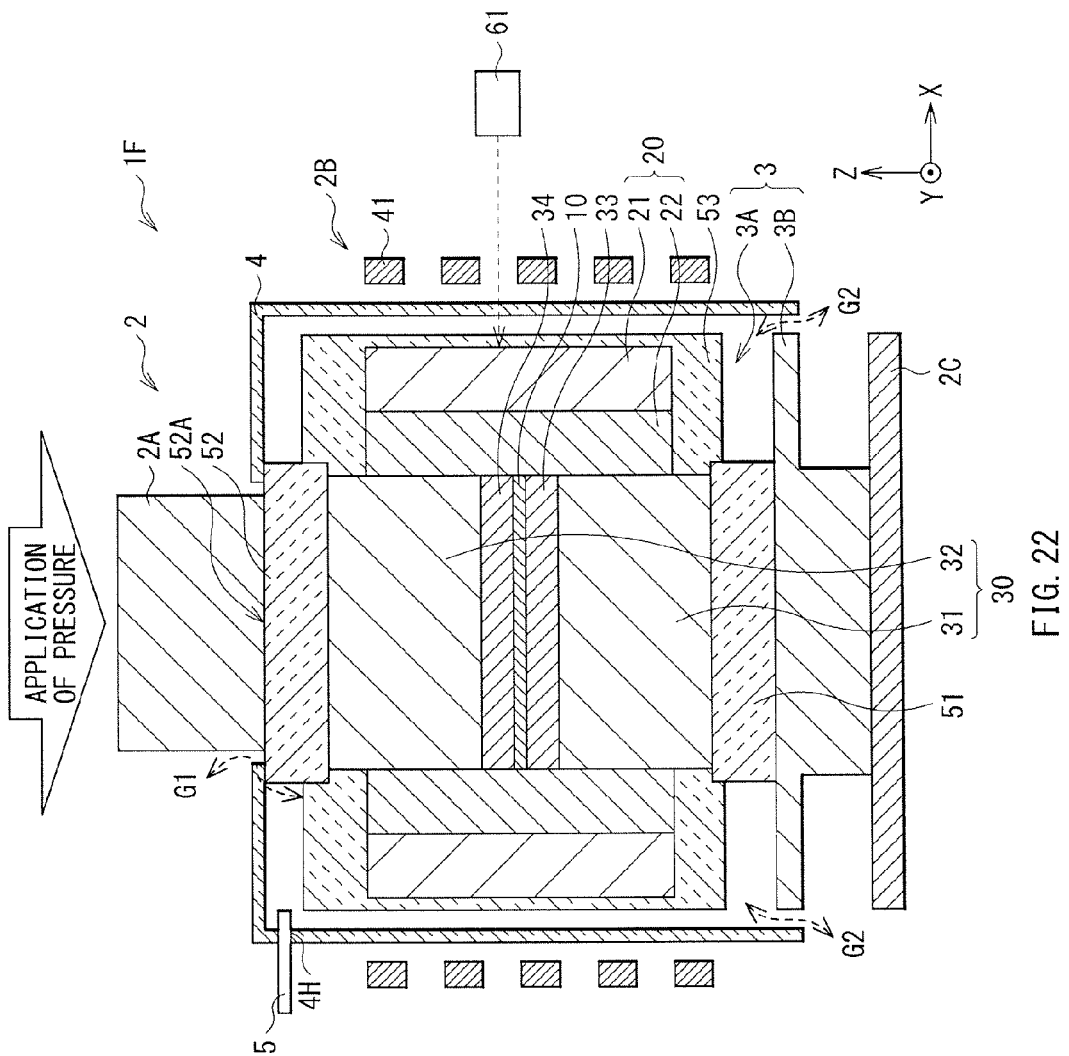
FIG. 22 is a cross-sectional view showing a configuration of a sintering apparatus according to a seventh embodiment of the present disclosure.

FIG. 22 shows a cross-sectional configuration of a sintering apparatus 1F according to a seventh embodiment of the present disclosure. This embodiment represents that a gas introduction pipe 5 is connected to the covering member 4 in the above-described first embodiment. With the exception of this point, the sintering apparatus 1F has a configuration, a function, and effects similar to those of the sintering apparatus 1 according to the above-described first embodiment. Therefore, the description is provided in such a manner that any component parts essentially same as those of the sintering apparatus 1 according to the above-described first embodiment are denoted with the same reference numerals.

The non-transportable section 2 and the transportable section 3 are configured in the same manner as with the first embodiment.

Figure 23:
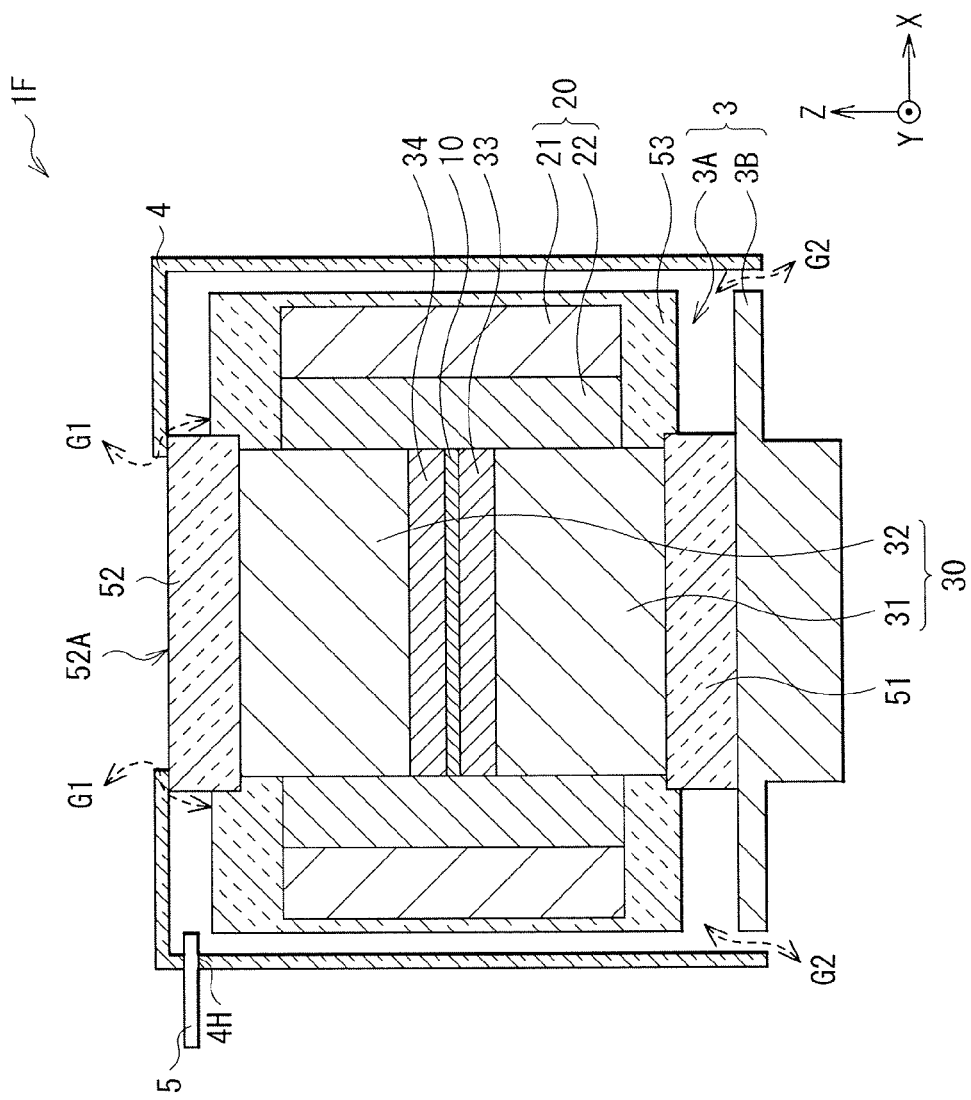
FIG. 23 is a cross-sectional view showing a state where a transportable section illustrated in FIG. 22 is separated from a fixed section.

As with the first embodiment, this sintering apparatus 1F has a covering member 4. As is the case in the first embodiment, the covering member 4 envelops the transportable section 3 loaded on the non-transportable section 2 in an almost hermetically sealed state, and allows the transportable section 3 to be separated from the non-transportable section 2 with the transportable section 3 enveloped in the almost hermetically sealed state as shown in FIG. 23. In the sintering apparatus 1F, this makes it possible to maintain the high productivity, as well as to suppress consumption of the mold 20 as with the first embodiment.

The covering member 4 has a through-hole 4H, and the gas introduction pipe 5 is inserted into this through-hole 4H. The covering member 4 serves to configure the almost hermetically sealed state at the periphery of the transportable section 3. However, there could be a concern about a possibility that some degree of oxidation will make progress due to residual oxygen inside the covering member 4, resulting in the mold 20 being consumed to some extent. By attaching the gas introduction pipe 5 to the covering member 4, inert gas is introduced into the inner side of the covering member 4, thereby allowing consumption of the mold 20 to be further suppressed.

Figure 24:
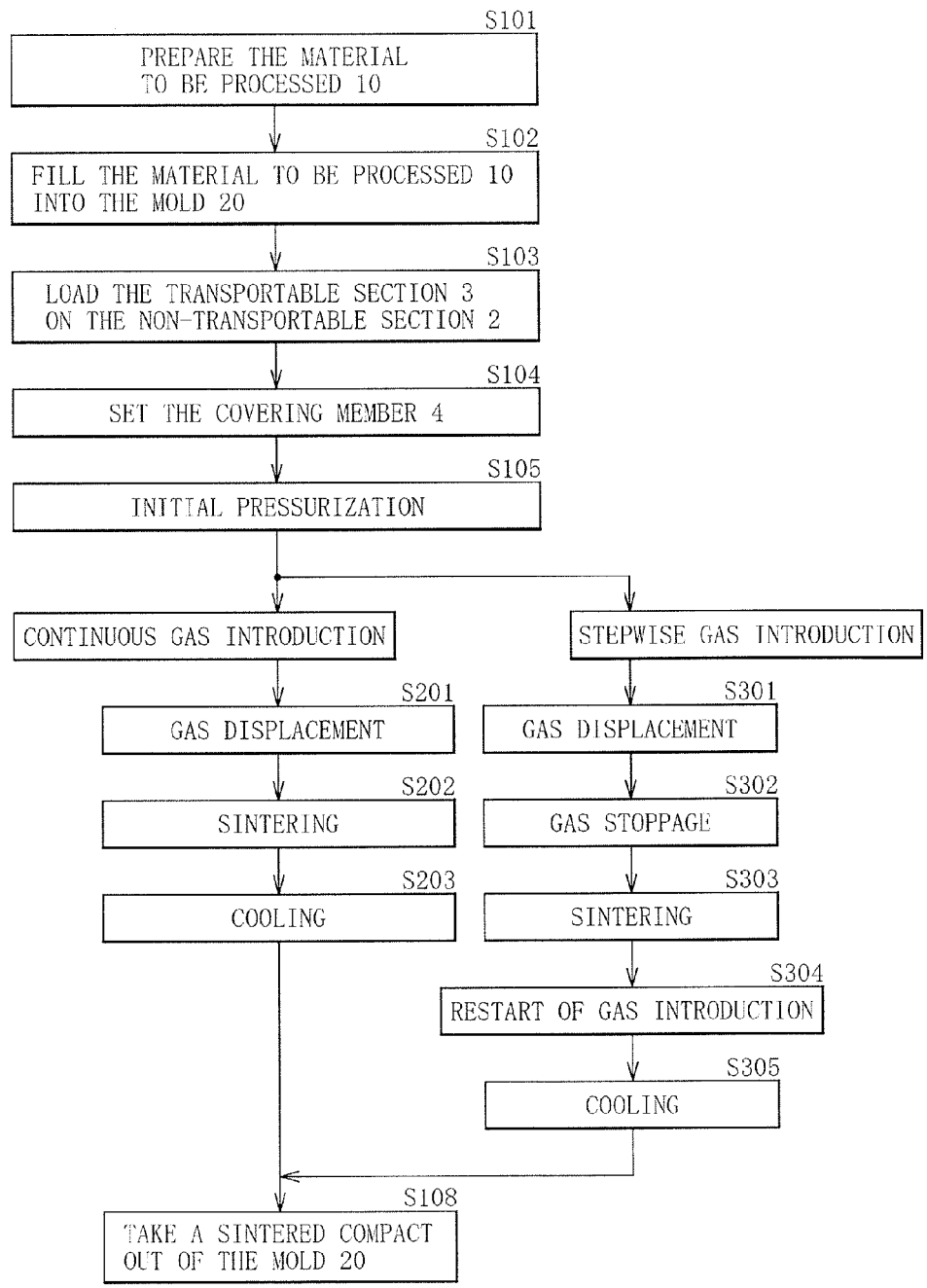
FIG. 24 is a flowchart showing a flow of a method of manufacturing a sintered compact using the sintering apparatus illustrated in FIG. 22.

FIG. 24 shows a flow of a method of manufacturing a sintered compact using the sintering apparatus 1F.

First, the material to be processed 10 is prepared by mixing and drying main raw material powder and additive raw material powder, for example (step S101).

Next, the lower punch 31 and the lower spacer 33 are mounted in the mold 20, and the material to be processed 10 is filled into the mold 20, and then the upper spacer 34 and the upper punch 32 are placed thereon. This accommodates the material to be processed 10 in the mold 20 (step S102). The main body 3A is formed in such a manner that the punch 30 is interposed between the lower heat-insulating plate 51 and the upper heat-insulating plate 52 from top and bottom, and the heat-insulating material 53 is wound around the mold 20. The transportable section 3 is formed by placing this main body 3A on the support base 3B.

Afterward, the transportable section 3 is loaded on the non-transportable section 2 that is mounted in the atmosphere (step S103).

Subsequently, the transportable section 3 is covered with the covering member 4, and the transportable section 3 is enveloped by the covering member 4 in an almost hermetically sealed state as shown in FIG. 22 (step S104).

After covering of the transportable section 3 with the covering member 4, setting of the pressure ram 2A and the high-frequency induction coil 41 as well as axial (positional) adjustment is carried out simultaneously to complete setting of the covering member 4. Thereafter, initial pressurization is performed by applying a pressure to the pressure ram 2A (step S105).

Next, gas is introduced into the inner side of the covering member 4 using the gas introduction pipe 5. There are two gas introduction methods of a continuous introduction and a step introduction. Hereinafter, the description is provided on such methods in order.

(Continuous Gas Introduction)

In introducing gas continuously, after the initial pressurization is completed, for example, Ar gas is introduced for a given length of time to perform displacement of gas present in the inner side of the covering member 4 (step S201). On this occasion, as gas to be introduced, inert gas such as Ar, He, Ne, Kr, and Xe, as well as nitrogen ($N_2$) or carbon dioxide ($CO_2$) may be preferably introduced.

After the gas displacement is carried out, heating is started while a gas flowing state is kept. In such a manner, the material to be processed 10 in the transportable section 3 is pressurized and heated with the transportable section 3 enveloped by the covering member 4 in the almost hermetically sealed state to carry out the intended sintering process (step S202).

Upon completion of the sintering, cooling is performed with a gas flowing state kept (step S203). The pressure ram 2A is retracted to the upside once the sintering is completed, and as shown in FIG. 23, the transportable section 3 is separated from the non-transportable section 2 with the transportable section 3 enveloped by the covering member 4 in the almost hermetically sealed state to be moved to another location for cooling. Also during cooling, a gas flowing state is maintained.

At the end of cooling, the sintered compact is taken out of the mold 20 (step S108). The steps described thus far complete the method of manufacturing the sintered compact according to this embodiment (in a case of the continuous gas introduction).

(Stepwise Gas Introduction)

In performing the stepwise gas introduction, such a method is further divided into three cases as shown in FIG. 25. In a first case, gas is introduced during gas displacement and during cooling, and gas is stopped during sintering. In a second case, gas is introduced only during cooling, and no gas displacement is performed, and gas is stopped during sintering. In a third case, gas displacement is only performed, and gas is stopped during sintering and during cooling. It is to be noted that FIG. 24 shows only the first case, and omits the second and third cases.

(First Case: Gas is Introduced Only During Gas Displacement and During Cooling)

In this case, after the initial pressurization is completed, for example, Ar gas is introduced for a given length of time to perform displacement of gas present in the inner side of the covering member 4 (step S301). Upon completion of the gas displacement, gas is stopped (step S302). It is also possible to detach a gas pipe from the gas introduction pipe 5, and then cap the gas introduction pipe 5 simply as necessary. This is a preventive measure for preventing the gas piping from being damaged due to heat or vibration in the pressurized heating process.

After stoppage of gas introduction at the end of the gas displacement, heating is started. In such a manner, the material to be processed 10 in the transportable section 3 is pressurized and heated with the transportable section 3 enveloped by the covering member 4 in the almost hermetically sealed state to carry out the intended sintering process (step S303). The reason for stopping the gas introduction in the sintering process in such a manner is that some degree of effect is obtained even if gas is not flown continuously because thermal expansion of internal gas takes place at elevated temperature to limit inflow of the air from the outside to a negligible level.

Upon completion of the sintering, after the gas introduction pipe is uncapped and gas piping is connected, the gas introduction is resumed (step S304) and cooling is performed (step S305). The pressure ram 2A and the high-frequency induction heating coil 41 are retracted to the upside once the sintering is completed, and as shown in FIG. 23, the transportable section 3 is separated from the non-transportable section 2 with the transportable section 3 enveloped by the covering member 4 in the almost hermetically sealed state to be moved to another location for cooling. The reason for resuming the gas introduction during cooling is that the air inflows from the outside after completion of the sintering, and thus the atmospheric gas may be preferably introduced at a flow rate exceeding that of the ambient air for maintaining an environment in the inner side of the covering member 4.

At the end of cooling, the sintered compact is taken out of the mold 20 (step S108). The steps described thus far complete the method of manufacturing the sintered compact according to this embodiment (in a case of the stepwise gas introduction).

In a case of the stepwise gas introduction, the gas introduction may be carried out both before and after the sintering process as described above. However, as shown in FIG. 25, only the gas displacement before the sintering process may be also carried out. Alternatively, also as shown in FIG. 25, the gas introduction may be carried out only during cooling after the sintering process.

Eighth Embodiment

Figure 26:
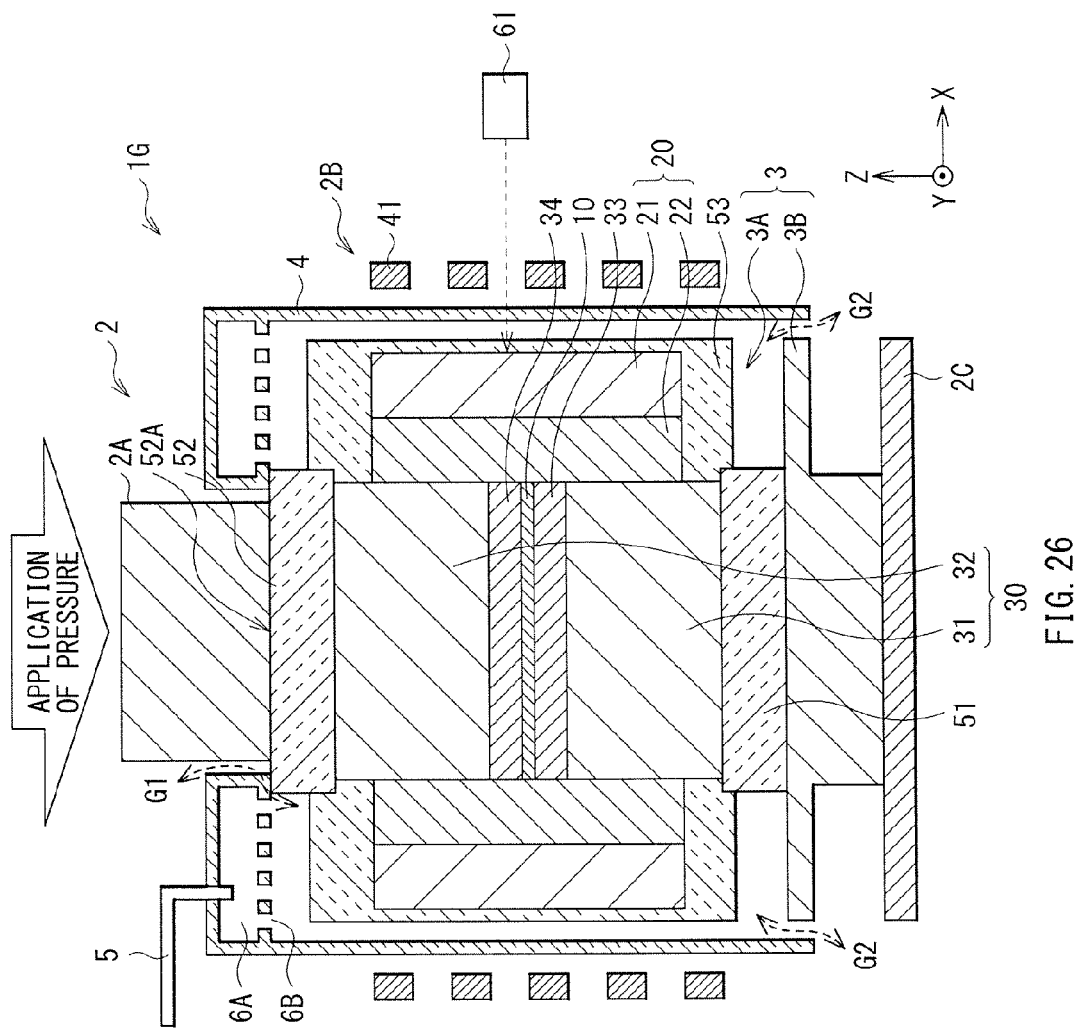
FIG. 26 is a cross-sectional view showing a configuration of a sintering apparatus according to an eighth embodiment of the present disclosure.
Figure 27:
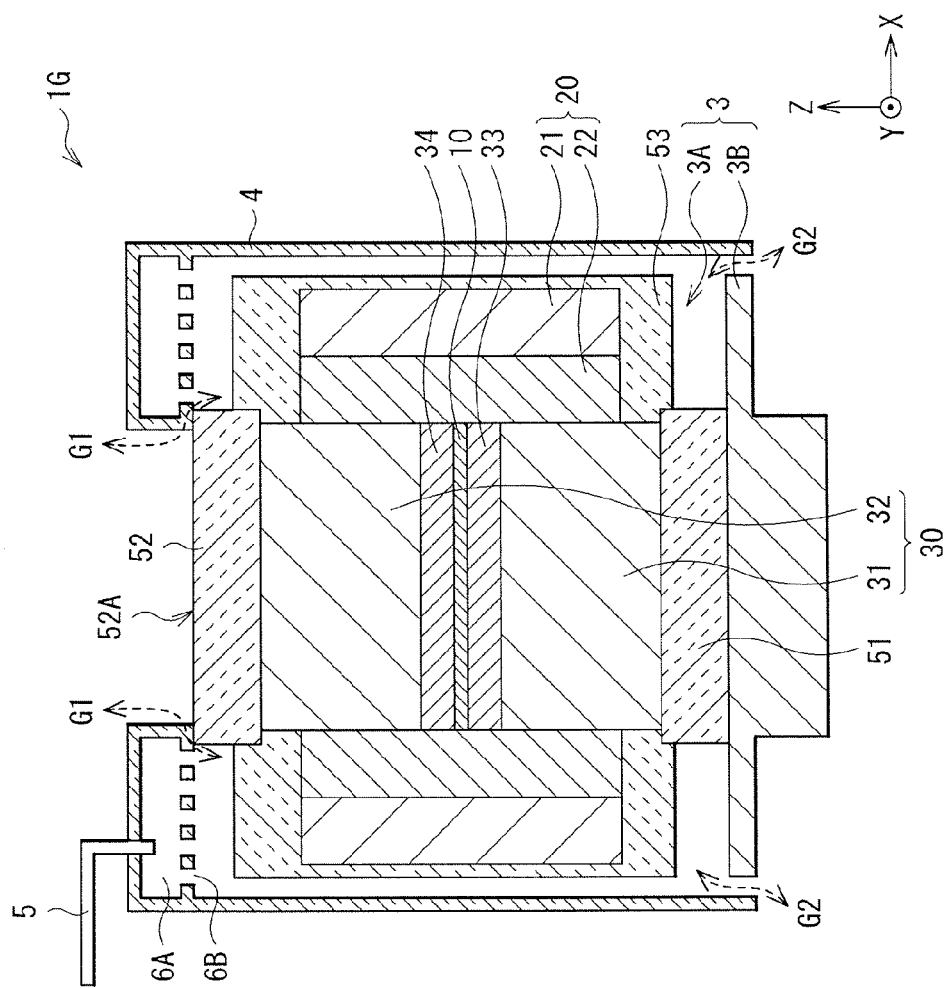
FIG. 27 is a cross-sectional view showing a state where a transportable section illustrated in FIG. 26 is separated from a fixed section.

FIG. 26 shows a cross-sectional configuration of a sintering apparatus 1G according to an eighth embodiment of the present disclosure. FIG. 27 shows a state where the transportable section 3 illustrated in FIG. 26 is separated from the non-transportable section 2. This embodiment represents that a gas diffusion chamber 6A and a gas blowoff outlet 6B are provided in the seventh embodiment. With the exception of this point, the sintering apparatus 1G has a configuration, a function, and effects similar to those of the sintering apparatus 1F according to the above-described seventh embodiment. Therefore, the description is provided in such a manner that any component parts essentially same as those of the sintering apparatus 1F according to the above-described seventh embodiment are denoted with the same reference numerals.

The gas diffusion chamber 6A has a dual structure of the top surface of the covering member 4, and is provided in a manner of being joined with the gas introduction pipe 5 and surrounding the main body 3A. The gas blowoff outlet 6B is provided on the underside of the gas diffusion chamber 6A, that is, on the side in contact with the main body 3A, and has a number of holes. By providing the gas diffusion chamber 6A and the gas blowoff outlet 6B in such a manner, it is possible to improve the gas displacement efficiency, that is, to distribute gas evenly. It is to be noted that the diameters, the number, the layout, and the like of the holes are optimally designed as appropriate.

Ninth Embodiment

Figure 28:
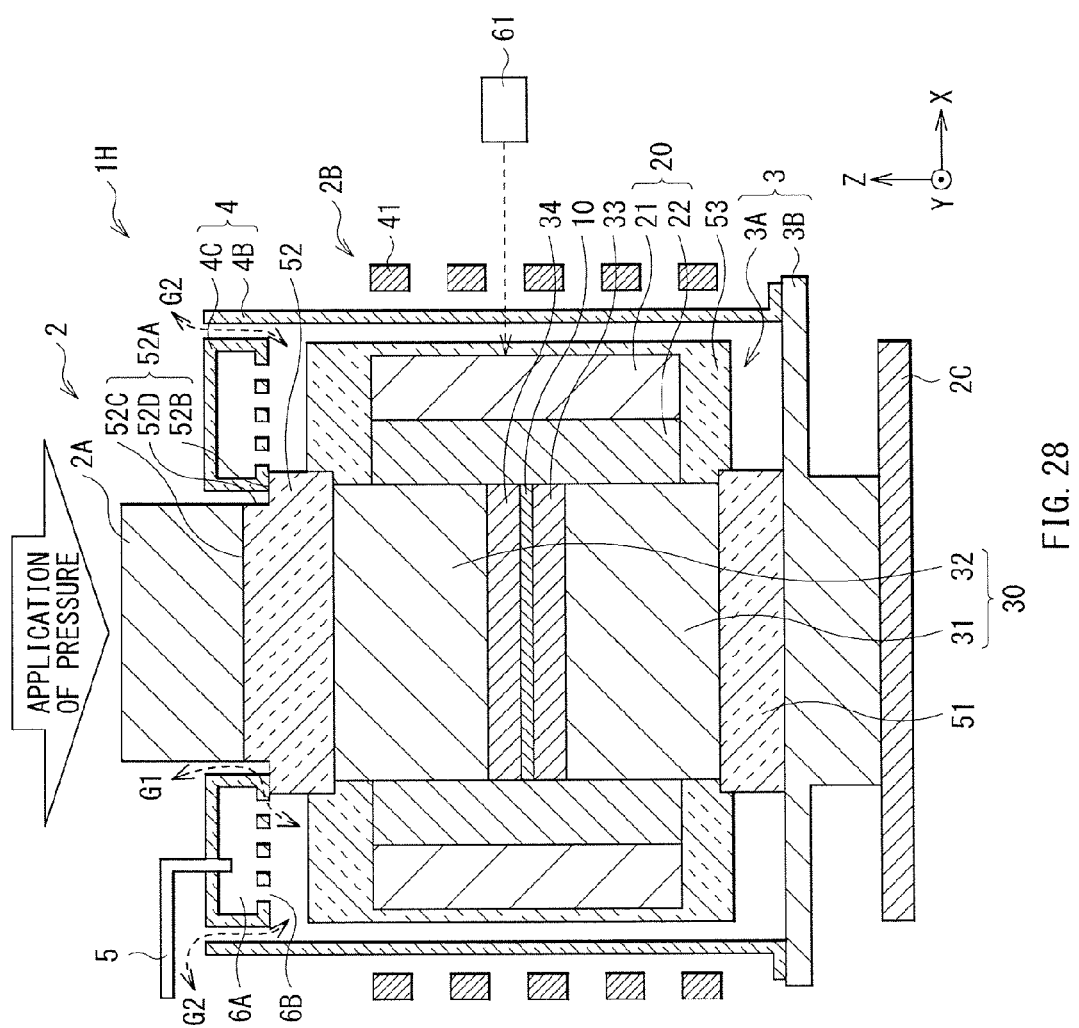
FIG. 28 is a cross-sectional view showing a configuration of a sintering apparatus according to a ninth embodiment of the present disclosure.
Figure 29:
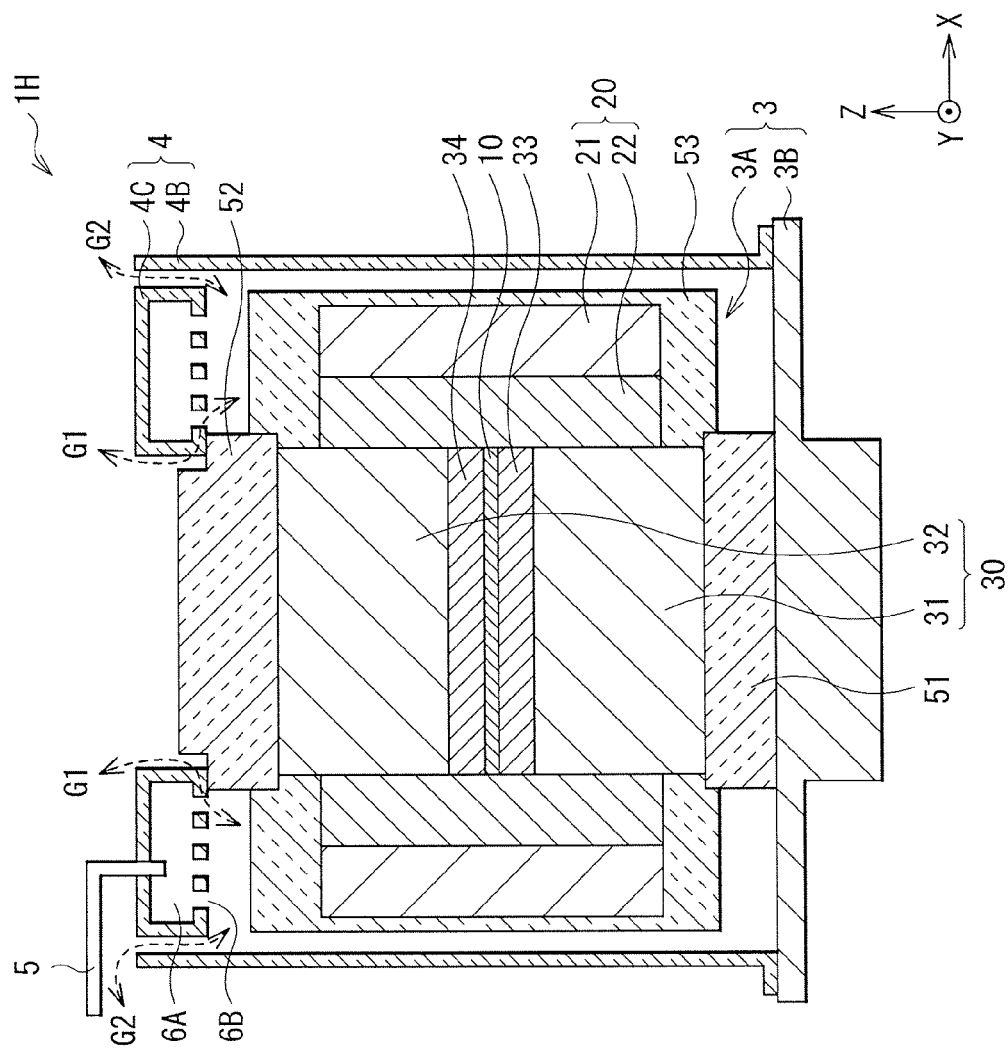
FIG. 29 is a cross-sectional view showing a state where a transportable section illustrated in FIG. 28 is separated from a fixed section.

FIG. 28 shows a cross-sectional configuration of a sintering apparatus 1H according to a ninth embodiment of the present disclosure. FIG. 29 shows a state where the transportable section 3 illustrated in FIG. 28 is separated from the non-transportable section 2. This embodiment represents that the gas introduction pipe 5 is connected to the upper covering member 4C, and the gas diffusion chamber 6A and the gas blowoff outlet 6B are provided in the fifth embodiment. With the exception of this point, the sintering apparatus 1H has a configuration, a function, and effects similar to those of any of the sintering apparatuses 1F and 1G according to the above-described seventh and eighth embodiments, respectively.

Tenth Embodiment

Figure 30:
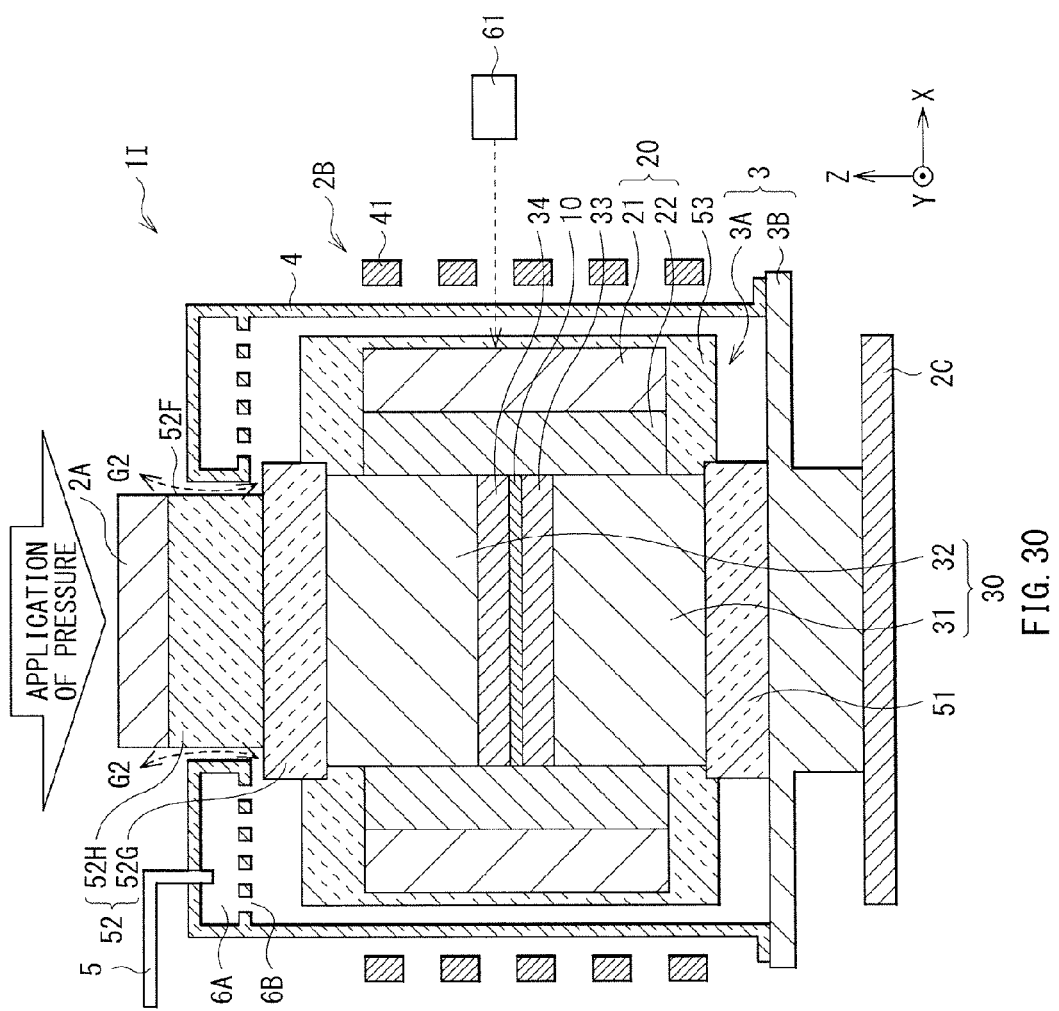
FIG. 30 is a cross-sectional view showing a configuration of a sintering apparatus according to a tenth embodiment of the present disclosure.
Figure 31:
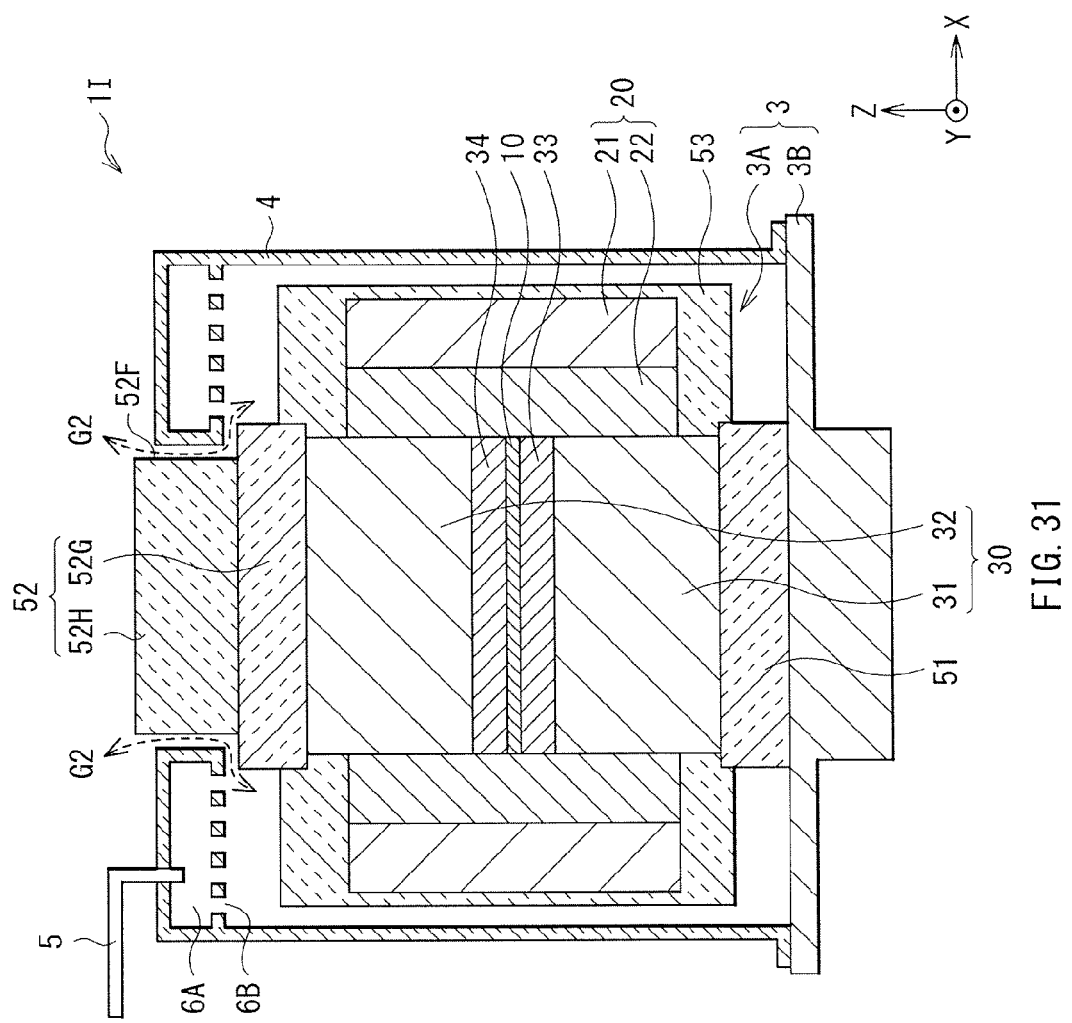
FIG. 31 is a cross-sectional view showing a state where a transportable section illustrated in FIG. 30 is separated from a fixed section.

FIG. 30 shows a cross-sectional configuration of a sintering apparatus 1I according to a tenth embodiment of the present disclosure. FIG. 31 shows a state where the transportable section 3 illustrated in FIG. 30 is separated from the non-transportable section 2. This embodiment represents that the gas introduction pipe 5 is connected to the covering member 4, and the gas diffusion chamber 6A and the gas blowoff outlet 6B are provided in the sixth embodiment.

With the exception of this point, the sintering apparatus 1I has a configuration, a function, and effects similar to those of any of the sintering apparatuses 1F and 1G according to the above-described seventh and eighth embodiments, respectively.

Eleventh Embodiment

Figure 32:
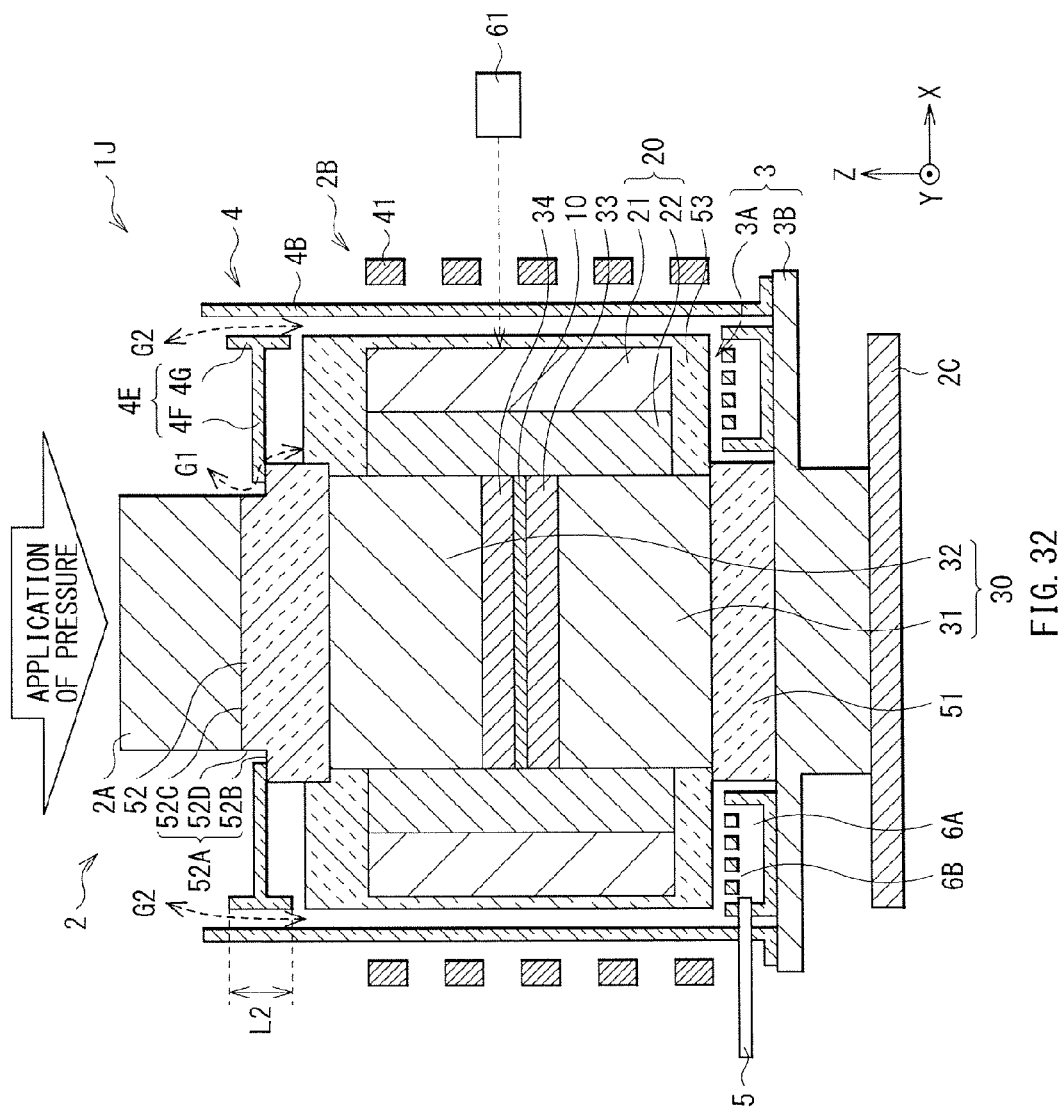
FIG. 32 is a cross-sectional view showing a configuration of a sintering apparatus according to an eleventh embodiment of the present disclosure.
Figure 33:
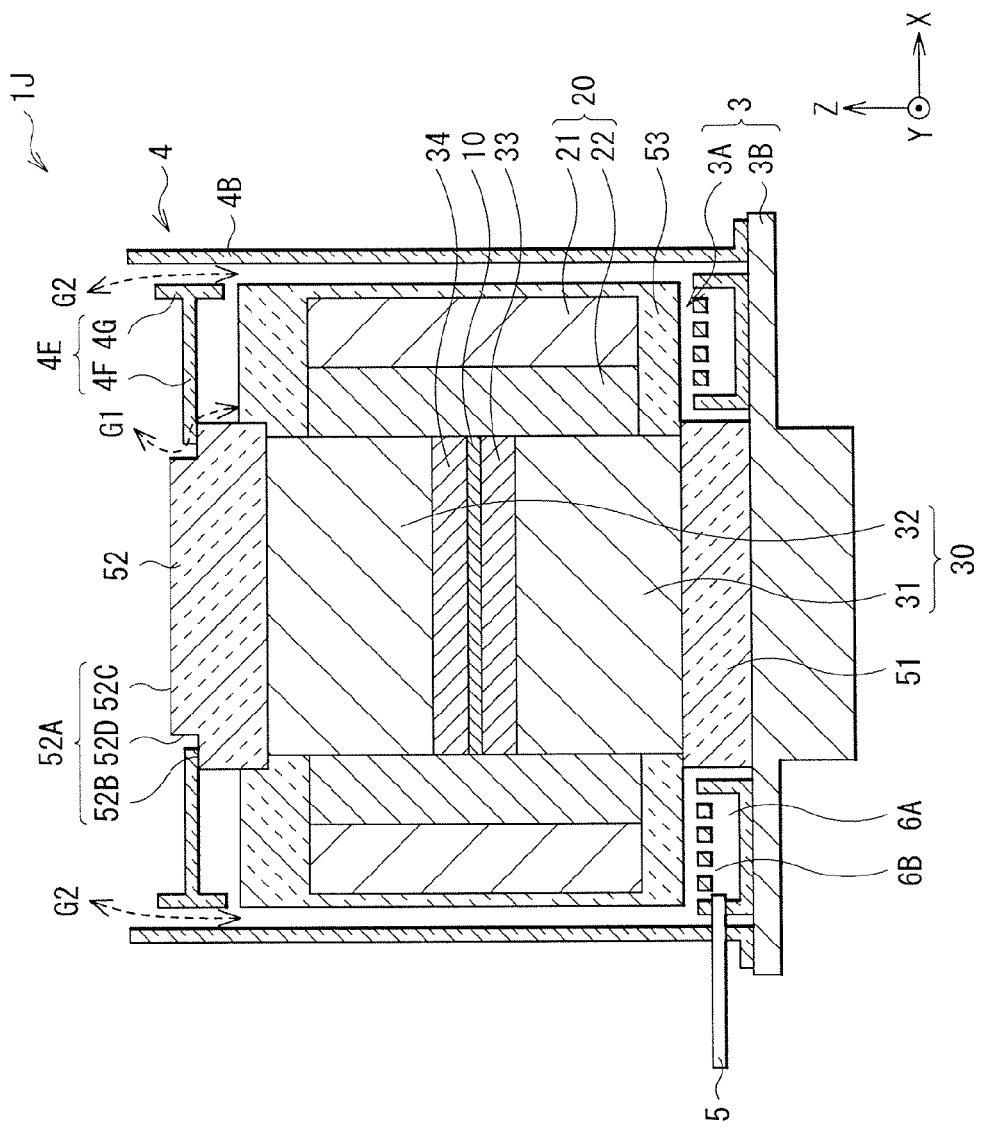
FIG. 33 is a cross-sectional view showing a state where a transportable section illustrated in FIG. 32 is separated from a fixed section.

FIG. 32 shows a cross-sectional configuration of a sintering apparatus 1J according to an eleventh embodiment of the present disclosure. FIG. 33 shows a state where the transportable section 3 illustrated in FIG. 32 is separated from the non-transportable section 2. This embodiment represents that the gas introduction pipe 5 is connected to the underside of the lower covering member 4B, and the gas diffusion chamber 6A and the gas blowoff outlet 6B are provided in the fifth embodiment. With the exception of this point, the sintering apparatus 1I has a configuration, a function, and effects similar to those of any of the sintering apparatuses 1F and 1G according to the above-described seventh and eighth embodiments, respectively.

Modification Example 1

Figure 34:
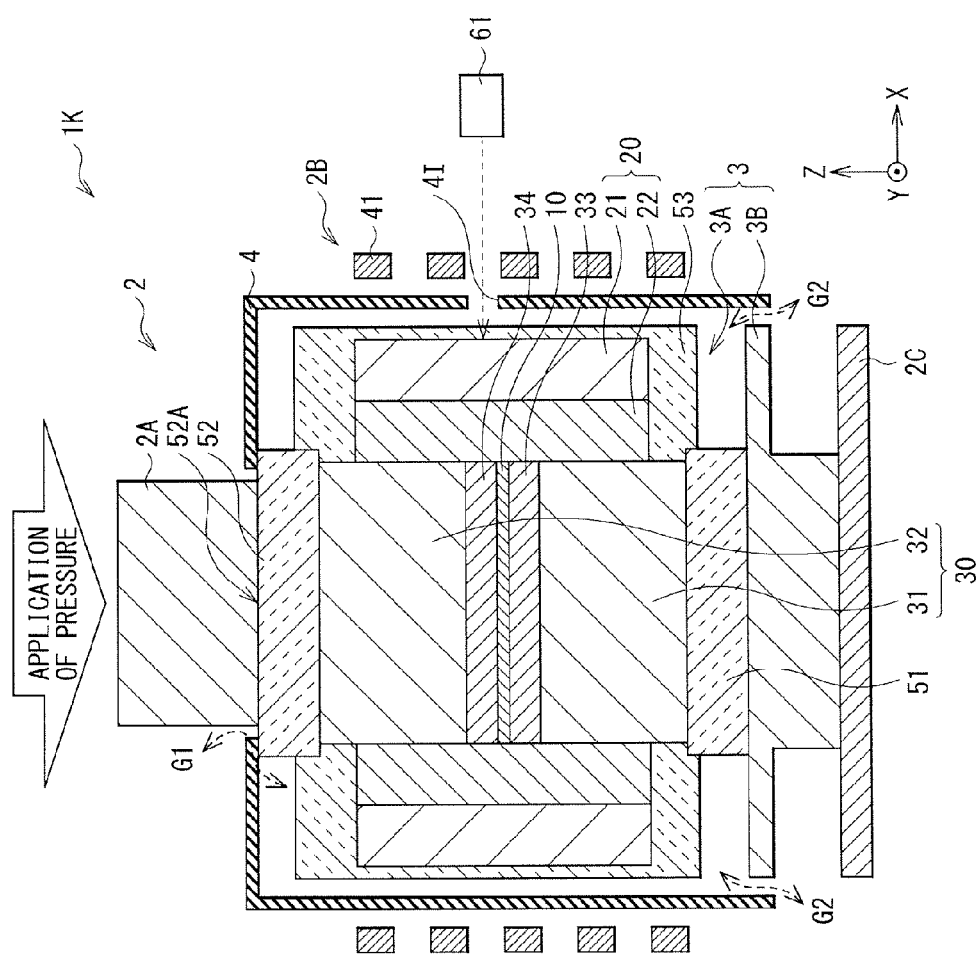
FIG. 34 is a cross-sectional view showing a configuration of a sintering apparatus according to a modification example 1.

FIG. 34 shows a cross-sectional configuration of a sintering apparatus 1K according to a modification example 1. This modification example represents that the covering member 4 is made of a ceramic material, and an opening for temperature measurement 4I is provided on the side surface in the first embodiment. This makes it possible to transmit infrared rays from the radiation thermometer 61 therethrough, which allows the temperature measurement of the mold 20 to be made by the use of the radiation thermometer 61.

Modification Example 2

Figure 35:
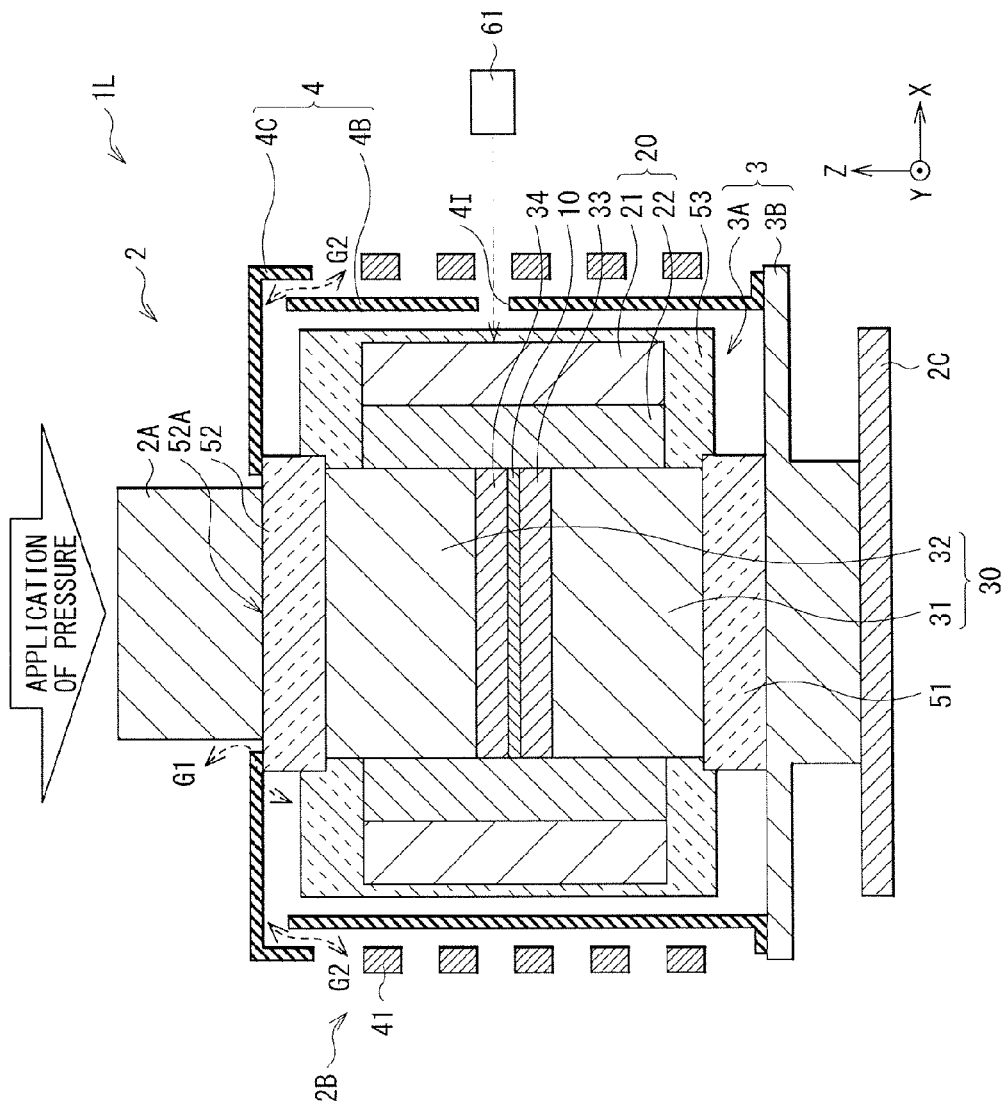
FIG. 35 is a cross-sectional view showing a configuration of a sintering apparatus according to a modification example 2.

FIG. 35 shows a cross-sectional configuration of a sintering apparatus 1L according to a modification example 2. This modification example represents that each of the upper covering member 4C and the lower covering member 4B is made of a ceramic material, and the opening for temperature measurement 4I is provided on the side surface of the lower covering member 4B in the fifth embodiment. With the exception of this point, the sintering apparatus 1L has a configuration, a function, and effects similar to those of the sintering apparatuses 1K according to the above-described modification example 1.

Modification Example 3

Figure 36:
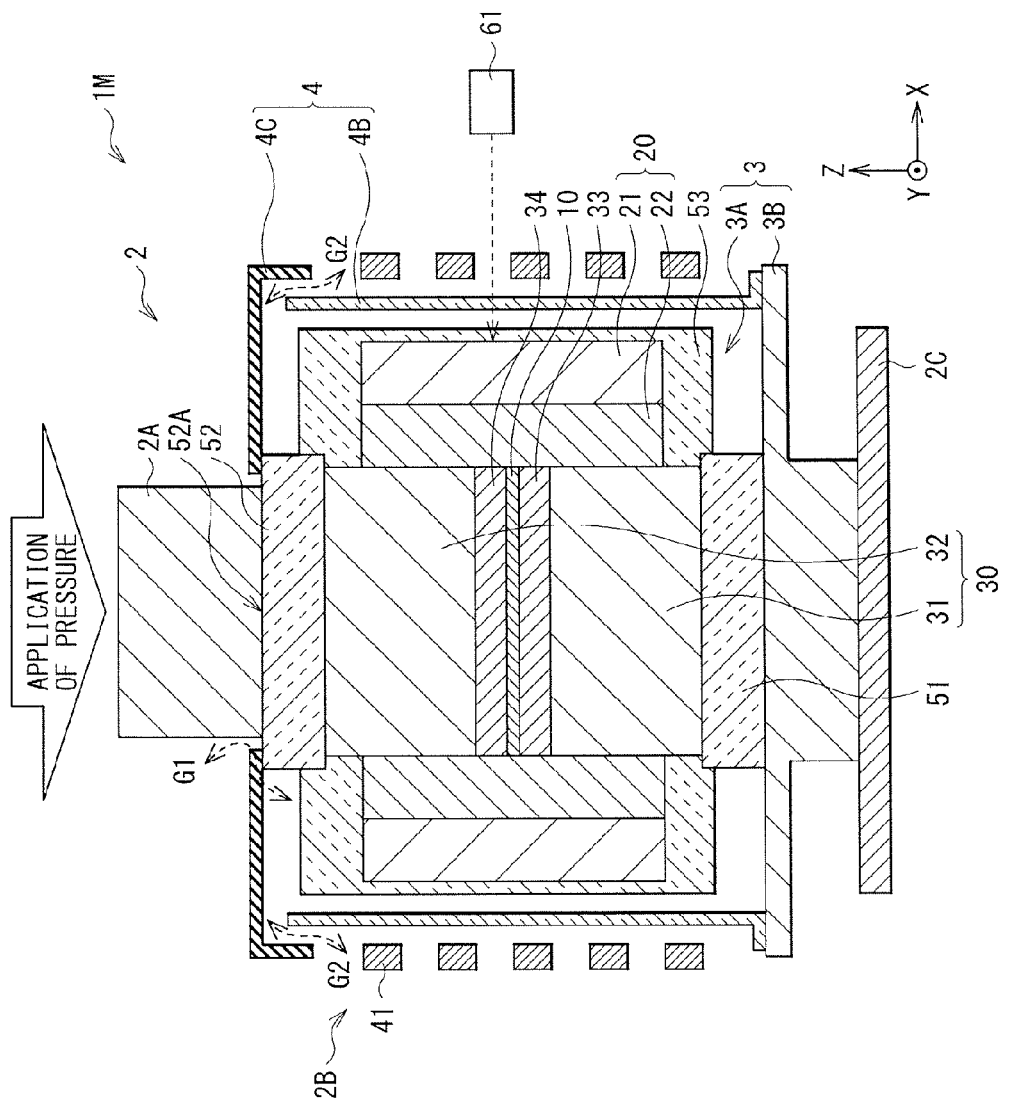
FIG. 36 is a cross-sectional view showing a configuration of a sintering apparatus according to a modification example 3.

FIG. 36 shows a cross-sectional configuration of a sintering apparatus 1M according to a modification example 3. This modification example represents that the upper covering member 4C is made of a ceramic material, while the lower covering member 4B is made of quartz glass, and the opening for temperature measurement 4I is allowed to be omitted in the fifth embodiment. With the exception of this point, the sintering apparatus 1M has a configuration, a function, and effects similar to those of the sintering apparatuses 1L according to the above-described modification example 2.

Modification Example 4

Figure 37:
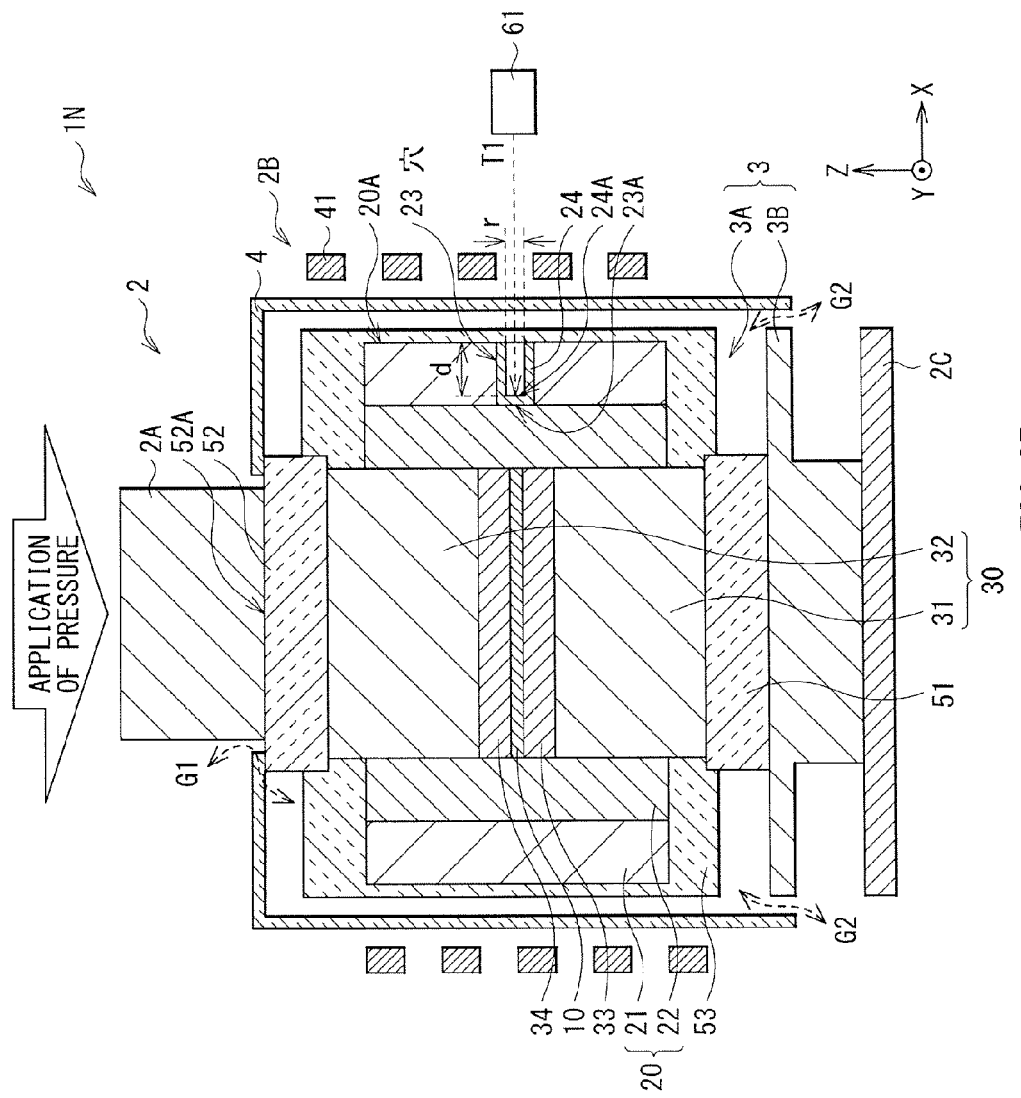
FIG. 37 is a cross-sectional view showing a configuration of a sintering apparatus according to a modification example 4.
Figure 38:
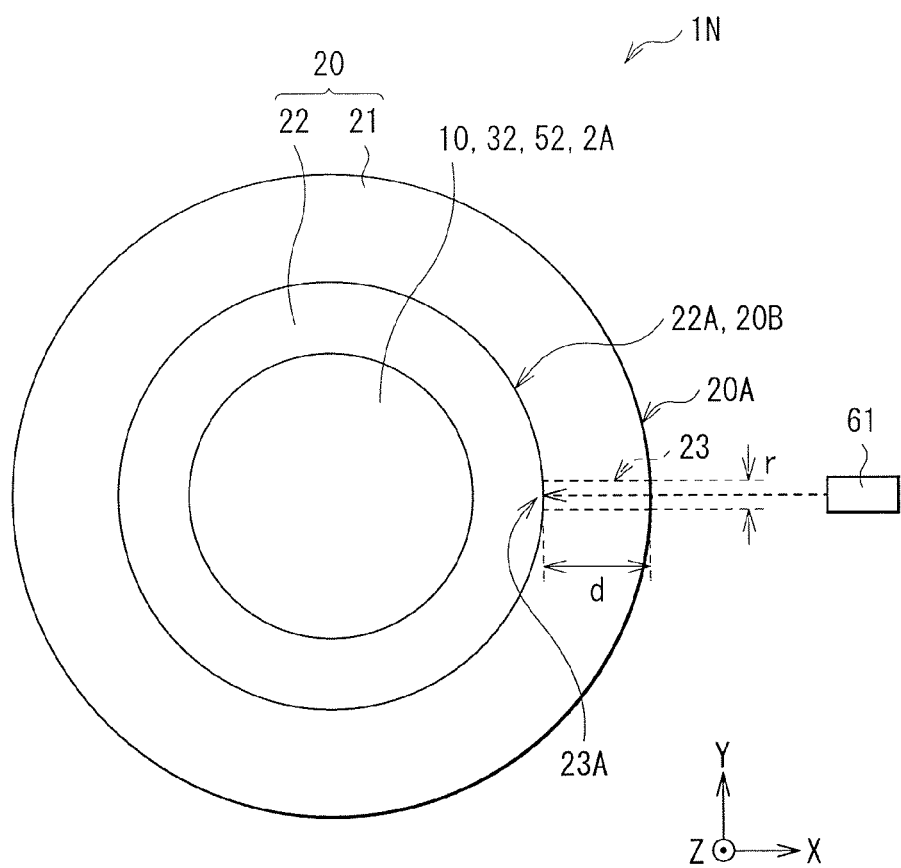
FIG. 38 is a plan view showing a configuration of the sintering apparatus illustrated in FIG. 37 that is viewed from the upside.

FIG. 37 shows a cross-sectional configuration of a sintering apparatus 1N according to a modification example 4. FIG. 38 shows a planar configuration of the sintering apparatus 1N illustrated in FIG. 37 that is viewed from the upside. This modification example represents that a hole 23 heading toward the internal direction from the outer surface of the mold 20 is provided in the first embodiment. With the exception of this point, the sintering apparatus 1N has a configuration, a function, and effects similar to those of the sintering apparatuses 1 according to the above-described first embodiment.

The hole 23 is a hole for temperature measurement that is provided in a manner to head toward the internal direction from the outer surface of the mold 20. Provision of the hole 23 makes it possible to measure first temperature T1 on an end surface 23A in the innermost of the hole 23 using the radiation thermometer 61 for reducing an influence of deterioration in the outer surface of the mold 20, which ensures that the stable temperature measurement is made.

More specifically, the temperature measurement may be preferably made at a location closer to the material to be processed 10. However, it is difficult to make a fixed-point measurement of members that are movable by additional pressure, such as the punch 30 and the insert dice 22. Further, in a case of the open-type hot pressing apparatus, on the outer surface 20A of the dice 21, a state of the surface or a circumferential part may be changed due to oxidation, and thus a more stable measurement location is desired. For such a reason, it may be preferable that the hole 23 be provided on the dice 21, and the temperature measurement be made at the inside of the mold 20 and at a location closest to the insert dice 22. In other words, the hole 23 may be preferably provided to make it possible to measure the temperature of an outer surface 22A of the insert dice 22 that is exposed in the hole 23. However, when the hole 23 is provided in a pressure direction (Z direction) with respect to the dice 21, a length (depth) of the hole 23 becomes large, which is disadvantageous in terms of the strength. In addition, since there are many structures in the vertical direction of the dice 21, a structure for inflecting an optical axis path for measurement, such as a reflective mirror may be necessary in the measurement by the use of the radiation thermometer 61, which may complicate the apparatus configuration and pose an issue of the measuring accuracy as well. Therefore, it is advantageous in any terms of the simplicity of the apparatus configuration, retained strength of the dice 21, and improved accuracy of the temperature measurement that the hole 23 is provided at a part of the thickness direction of the mold 20 in a direction (diametrical direction of the mold 20) vertical to a pressure direction (Z direction) heading from the outer surface 20A toward a center of the mold 20.

Above all, by the combined use of the covering member 4 made of quartz glass or the ceramic-made covering member 4 having the opening for temperature measurement 4I on the side surface thereof, and the hole 23, it is possible to measure the temperature in the inside of the mold 20. Further, the covering member 4 allows an almost hermetically sealed state to be maintained, which makes it possible to easily deal with any atmospheric variations.

In concrete terms, the hole 23 may be preferably provided from the outer surface 20A to the inner surface 20B of the dice 21. In other words, it may be preferable that the hole 23 run through the dice 21, but be not communicated with the dice 21 and the insert dice 22. This is because it is likely that the material to be processed 10 will get out of the hole 23 to the outside in association with pressurization when the hole 23 runs through the overall mold 20 completely. Further, this is because it is likely that the hole 23 inside the dice 21 and the hole 23 inside the insert dice 22 will be misaligned with each other when the hole 23 is communicated with the dice 21 and the insert dice 22.

It is to be noted that a position of the hole 23 in a circumferential direction is not limited specifically, but the hole 23 may be preferably provided at a position where a thickness of the insert dice 22 is relatively larger. The heat-insulating material 53 that is wound on the mold 20 may be preferably wound in a manner to keep away from the hole 23.

Further, this sintering apparatus 1N has a closed-end tube 24 which has a closed end surface 24A at a first end and a second end of which is open. The closed-end tube 24 is fitted into the hole 23 with the closed end surface 24A brought into contact with the outer surface 22A of the insert dice 22. The reason for such a configuration is as follows. In a case of a closed-type, because the sintering is carried out under vacuum or under atmosphere of inert gas, it is possible to measure the first temperature T1 on the end surface 23A in the innermost of the hole 23 using the radiation thermometer 61. On the other hand, in a case of an open-type, there could be a concern about a possibility that the outermost circumferential part (an area in the vicinity of an inlet) or the hole 23 itself will be enlarged due to the air atmosphere every time the sintering is performed. By fitting the closed-end tube 24 into the hole 23, it is possible to suppress deterioration in the inside of the hole 23 that may be caused by oxidation, which allows the temperature measurement that is stable on a long-time basis to be made.

A ratio of a diameter r to a depth (length) d of the hole 23 or the closed-end tube 24 may be preferably, for example, approximately 1:10 or more. This makes it possible to regard the inside of the hole 23 or the closed-end tube 24 as a pseudo blackbody cavity, which allows the absolute value accuracy in the temperature measurement to be improved. It is to be noted that each of FIG. 37 and FIG. 38 denotes the diameter r and depth d as the diameter r and depth d of the closed-end tube 24.

Such a closed-end tube 24 may be preferably configured of a material having the oxidation resistance. More specifically, examples of a constituent material for the closed-end tube 24 may include aluminum oxide (alumina), zirconium oxide (zirconia), hafnium oxide (hafnia) or these composite materials (for example, sialon and cordierite), and carborundum (silicon carbide). Alternatively, a material coating or cladding carbon graphite with any of the above-described materials may be acceptable.

Modification Example 5

Figure 39:
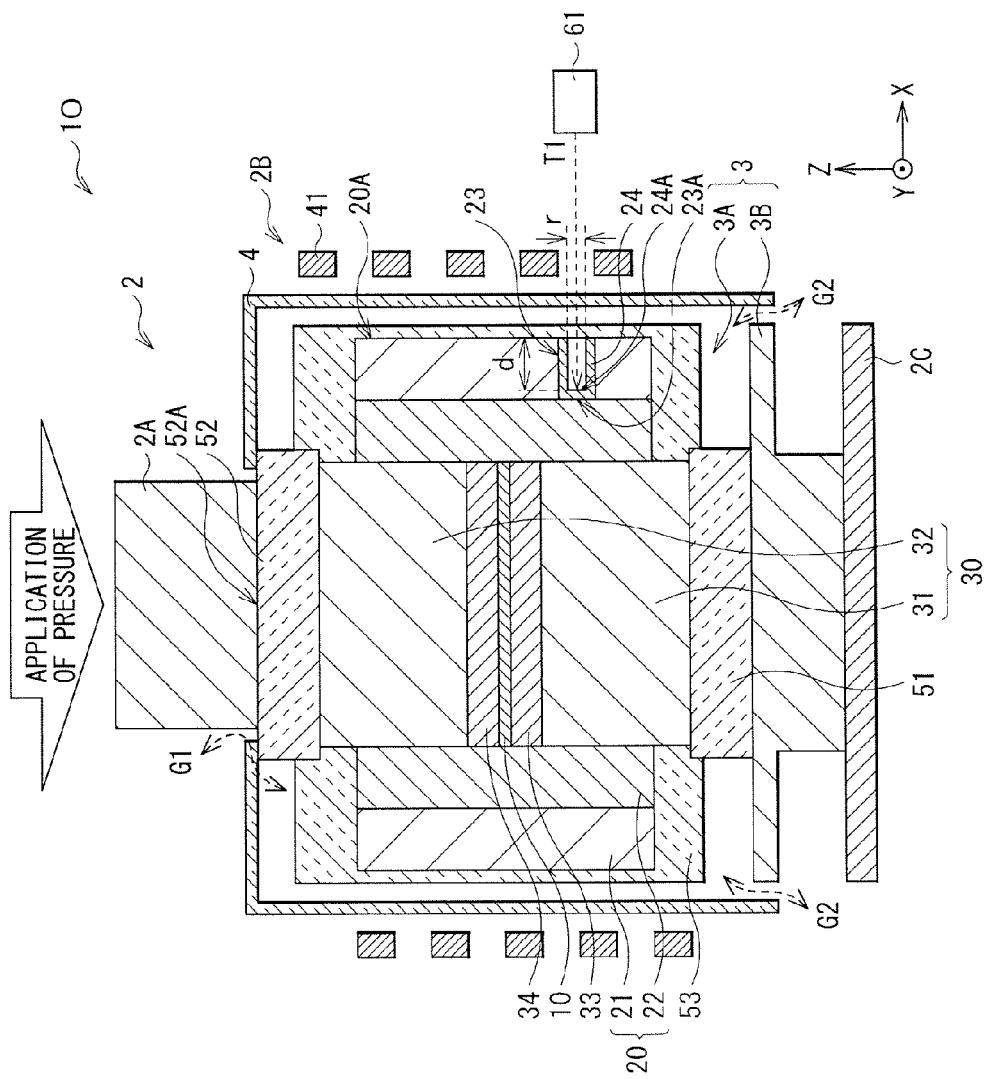
FIG. 39 is a cross-sectional view showing a configuration of a sintering apparatus according to a modification example 5.

FIG. 39 shows a cross-sectional configuration of a sintering apparatus 1O according to a modification example 5. This modification example represents that when the material to be processed 10 is placed in the mold 20, the hole 23 is provided at a position different from the placement position of the material to be processed 10 in a height direction (Z direction) of the mold 20 in the modification example 4. With the exception of this point, the sintering apparatus 1O has a configuration, a function, and effects similar to those of the sintering apparatuses 1N according to the above-described modification example 4.

As described above, when the material to be processed 10 is placed in the mold 20, the hole 23 is provided at a position shifted from the placement position of the material to be processed 10 in a height direction (Z direction) of the mold 20. In other words, the hole 23 is provided to avoid any position on an extended line in a diameter direction of the placement position of the material to be processed 10. This is because it was found from a result of the stress simulation that stresses to be exerted on the insert dice 22 and dice 21 at the time of sintering the material to be processed 10 would concentrate on the outward in the diameter direction of the material to be processed 10. In such a manner, by providing the hole 23 at the height position different from the placement position of the material to be processed 10 in the Z direction, it is possible to prevent a stress from the material to be processed 10 from being exerted directly on the hole 23.

It is to be noted that the hole 23 may be provided below (at a lower position) the placement position of the material to be processed 10 in the Z direction as shown in FIG. 39, or may be provided above (at a higher position) the placement position of the material to be processed 10 in the Z direction (not shown in the drawing).

The present disclosure is described thus far with reference to the embodiments. However, the present disclosure is not limited to the above-described embodiments, and various modifications may be made. For example, in the above-described embodiments, the description is provided on a case of a single-stage filling of the material to be processed 10. However, the present disclosure is not limited to such a single-stage filling of the material to be processed 10, and is also applicable to a multi-stage filling of the material to be processed 10. In this case, it is necessary to change a position of the hole 23 in the modification example 5 depending on a filling position or filling intervals of the material to be processed 10.

Further, in the above-described embodiments, the description is provided on a case where carbon paper, an upper spacer, a lower spacer, or the like that are made of the same material are interposed between the material to be processed 10 and the lower punch 31 or the upper punch 32. However, the lower punch 31 and the upper punch 32 may come in direct contact with the material to be processed 10.

In addition, for example, in the above-described embodiments, the configurations of the sintering apparatuses 1, and 1A to 1O are described in concrete terms. However, all of the component parts have not necessarily be provided, or any other component parts may be additionally provided.

The present disclosure is valid mainly for a sintering apparatus for a sputtering target of a ceramic-based material, and a method of manufacturing a sintered compact using such a sintering apparatus, and does not intend to limit a target material.

It is possible to achieve at least the following configurations from the above-described example embodiments of the disclosure.

(1) A sintering apparatus, including:
   a non-transportable section mounted in the atmosphere;
   a transportable section that has a mold capable of accommodating a material to be processed and is loaded detachably with respect to the non-transportable section; and
   a covering member that envelops the transportable section loaded on the non-transportable section in an almost hermetically sealed state and allows the transportable section to be separated from the non-transportable section with the transportable section enveloped in the almost hermetically sealed state.

(2) The sintering apparatus according to (1), wherein the transportable section has:
   a main body having the mold; and
   a support base on which the main body is mounted.

(3) The sintering apparatus according to (2), wherein the covering member is supported in a suspending arrangement by surface contact with a top surface of the main body, and an airflow-enabled gap is provided between the covering member and the support base.

(4) The sintering apparatus according to (3), wherein the top surface of the main body or the covering member has a step, and a relative positional relationship of the covering member with respect to the top surface of the main body is defined by the step.

(5) The sintering apparatus according to (2), wherein the covering member is supported by the surface contact with the support base, and an airflow-enabled gap is provided between the covering member and a side surface of the main body.

(6) The sintering apparatus according to (2), wherein the covering member has:
  a lower covering member supported by the surface contact with the support base; and
  an upper covering member supported in a suspending arrangement by surface contact with the top surface of the main body, wherein
  an airflow-enabled gap is provided between the lower covering member and the upper covering member.

(7) The sintering apparatus according to any one of (1) to (6), wherein the covering member is configured of quartz glass.

(8) The sintering apparatus according to any one of (1) to (6), wherein the covering member is configured of a ceramic material, and has an opening for temperature measurement on a side surface.

(9) The sintering apparatus according to (6), wherein the upper covering member is configured of a ceramic material, and the lower covering member is configured of quartz glass.

(10) The sintering apparatus according to any one of (1) to (9), wherein the covering member has a through-hole, and a gas introduction pipe is inserted into the through-hole.

(11) The sintering apparatus according to (10), wherein the covering member has:
  a gas diffusion chamber that is joined with the gas introduction pipe and surrounds the main body; and
  a gas blowoff outlet provided in the gas diffusion chamber.

(12) The sintering apparatus according to any one of (1) to (11), wherein the mold has a hole heading from an outer surface toward an inner surface.

(13) The sintering apparatus according to (12), wherein when the material to be processed is placed in the mold, the hole is provided at a position different from a placement position of the material to be processed in a height direction of the mold.

(14) The sintering apparatus according to any one of (1) to (13), wherein the non-transportable section has:
  a pressure member configured to pressurize the material to be processed in the mold; and
  a heating section configured to heat the material to be processed in the mold.

(15) The sintering apparatus according to (14), wherein the heating section has a high-frequency induction coil configured to perform induction heating of an outer surface of the mold.

(16) A method of manufacturing a sintered compact, the method including:
  loading a transportable section having a mold accommodating a material to be processed on a non-transportable section that is mounted in the atmosphere;
  enveloping the transportable section in an almost hermetically sealed state by means of a covering member;
  pressurizing and heating the material to be processed in the mold with the transportable section enveloped by the covering member in the almost hermetically sealed state; and
  separating the transportable section from the non-transportable section with the transportable section enveloped by the covering member in the almost hermetically sealed state after pressurizing and heating the material to be processed in the mold.

(17) The method according to (16), further including:
  introducing gas into an inner side of the covering member; and
  performing such gas introduction either or both before pressurizing and heating the material to be processed in the mold or/and after pressurizing and heating the material to be processed in the mold.

(18) The method according to (16), further including:
  introducing gas into an inner side of the covering member; and
  performing such gas introduction consecutively from before to after pressurizing and heating the material to be processed in the mold.

(19) The method according to any one of (16) to (18), further including:
  introducing gas into an inner side of the covering member; and
  introducing inert gas, nitrogen, or carbon dioxide as the gas.

(20) A target material, the target material being manufactured by loading a transportable section having a mold accommodating a material to be processed including a target raw material on a non-transportable section that is mounted in the atmosphere, and thereafter by pressurizing and heating the material to be processed in the mold with the transportable section enveloped by the covering member in the almost hermetically sealed state.

It should be understood by those skilled in the art that various modifications, combinations, sub-combinations and alterations may occur depending on design requirements and other factors insofar as they are within the scope of the appended claims or the equivalents thereof.

What is claimed is:

1. A sintering apparatus, comprising:
  a non-transportable section mounted exposed to the atmosphere;
  a transportable section that has a mold capable of accommodating a material to be processed and is loaded detachably with respect to the non-transportable section; and
  a covering member that, separately of the transportable section, envelops the transportable section, including the mold, in an almost hermetically sealed state and allows the transportable section and covering member to be jointly separated from the non-transportable section with the transportable section and the mold enveloped in the almost hermetically sealed state.

2. The sintering apparatus according to claim 1, wherein the transportable section has:
  a main body having the mold; and
  a support base on which the main body is mounted.

3. The sintering apparatus according to claim 2, wherein the covering member is supported in a suspending arrangement by surface contact with a top surface of the main body, and an airflow-enabled gap is provided between the covering member and the support base.

4. The sintering apparatus according to claim 3, wherein the top surface of the main body or the covering member has a step, and a relative positional relationship of the covering member with respect to the top surface of the main body is defined by the step.

5. The sintering apparatus according to claim 2, wherein the covering member is supported by the surface contact with the support base, and an airflow-enabled gap is provided between the covering member and a side surface of the main body.

6. The sintering apparatus according to claim 2, wherein the covering member has:
   a lower covering member supported by the surface contact with the support base; and
   an upper covering member supported in a suspending arrangement by surface contact with the top surface of the main body, wherein
   an airflow-enabled gap is provided between the lower covering member and the upper covering member.

7. The sintering apparatus according to claim 1, wherein the covering member is configured of quartz glass.

8. The sintering apparatus according to claim 1, wherein the covering member is configured of a ceramic material, and has an opening for temperature measurement on a side surface.

9. The sintering apparatus according to claim 6, wherein the upper covering member is configured of a ceramic material, and the lower covering member is configured of quartz glass.

10. The sintering apparatus according to claim 1, wherein the covering member has a through-hole, and a gas introduction pipe is inserted into the through-hole.

11. The sintering apparatus according to claim 10, wherein the covering member has:
   a gas diffusion chamber that is joined with the gas introduction pipe and surrounds the main body; and
   a gas blowoff outlet provided in the gas diffusion chamber.

12. The sintering apparatus according to claim 1, wherein the mold has a hole heading from an outer surface toward an inner surface.

13. The sintering apparatus according to claim 12, wherein when the material to be processed is placed in the mold, the hole is provided at a position different from a placement position of the material to be processed in a height direction of the mold.

14. The sintering apparatus according to claim 1, wherein the non-transportable section has:
   a pressure ram configured to pressurize the material to be processed in the mold; and
   a heating section configured to heat the material to be processed in the mold,
   wherein the covering member has an opening via which the pressure ram is received.

15. The sintering apparatus according to claim 14, wherein the heating section has a high-frequency induction coil configured to perform induction heating of an outer surface of the mold.

* * * * *